US012792284B2

(12) United States Patent
Park et al.

(10) Patent No.: US 12,792,284 B2
(45) Date of Patent: Nov. 10, 2026

(54) ELECTRONIC DEVICE AND METHOD OF DISPLAYING EXTERNAL DEVICE CORRESPONDING TO OPERATION METHOD OF THE ELECTRONIC DEVICE

(71) Applicant: SAMSUNG ELECTRONICS CO., LTD., Suwon-si (KR)

(72) Inventors: Hyeeun Park, Suwon-si (KR); Sehyun Kim, Suwon-si (KR); Jongin Lee, Suwon-si (KR); Kilsoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 313 days.

(21) Appl. No.: 18/111,394

(22) Filed: Feb. 17, 2023

(65) Prior Publication Data

US 2023/0305785 A1 Sep. 28, 2023

Related U.S. Application Data

(63) Continuation of application No. PCT/KR2023/001469, filed on Feb. 1, 2023.

(30) Foreign Application Priority Data

Mar. 24, 2022 (KR) ........................ 10-2022-0036929

(51) Int. Cl.
*G06F 3/14* (2006.01)
*A63F 13/52* (2014.01)

(52) U.S. Cl.
CPC ................ *G06F 3/14* (2013.01); *A63F 13/52* (2014.09)

(58) Field of Classification Search
CPC .................................. G06F 3/14; A63F 13/52
(Continued)

(56) References Cited

U.S. PATENT DOCUMENTS 7,853,207 B2 12/2010 Harada et al.
7,949,368 B2 5/2011 Hurula et al.
(Continued)

FOREIGN PATENT DOCUMENTS

JP 2014-204303 A 10/2014
JP 6057813 B2 1/2017
(Continued)

OTHER PUBLICATIONS

International Search Report and Written Opinion issued by the International Searching Authority on Apr. 28, 2023 in International Patent Application No. PCT/KR2023/001469 (PCT/ISA/220, PCT/ISA/210, PCT/ISA/237).
(Continued)

*Primary Examiner* — Michael A Cuff
(74) *Attorney, Agent, or Firm* — Sughrue Mion, PLLC

(57) ABSTRACT

An apparatus and a method of operating an electronic device includes identifying, from among a plurality of preset operation modes, a first operation mode of the electronic device that is currently operating on the electronic device, and obtaining information about at least one external device. The method further includes identifying, from among the at least one external device, a first external device corresponding to the identified first operation mode, based on the information about the at least one external device, and displaying, on a display of the electronic device, identification information about the identified first external device.

17 Claims, 13 Drawing Sheets

(58) Field of Classification Search
USPC ........................................................... 463/31
See application file for complete search history.

(56) References Cited

U.S. PATENT DOCUMENTS

| | | | | |
|---|---|---|---|---|
| 8,116,754 | B2 | 2/2012 | Kim et al. | |
| 9,854,012 | B2 | 12/2017 | Na et al. | |
| 10,278,042 | B2 | 4/2019 | Won et al. | |
| 10,986,688 | B2 | 4/2021 | Hor-Lao et al. | |
| 11,122,334 | B2 * | 9/2021 | McCarthy, III | H04N 21/478 |
| 11,762,620 | B2 * | 9/2023 | Stoyles | G06F 3/04842 345/11 |
| 11,798,508 | B2 | 10/2023 | Jeong | |
| 2007/0300188 | A1 | 12/2007 | Kim | |
| 2009/0147137 | A1 | 6/2009 | Bae et al. | |
| 2009/0203401 | A1 * | 8/2009 | Ahlinder | G06F 3/1454 455/557 |
| 2009/0298428 | A1 | 12/2009 | Shin | |
| 2009/0300620 | A1 * | 12/2009 | Park | H04N 21/47 715/825 |
| 2010/0281423 | A1 * | 11/2010 | Kano | G06F 3/0481 715/794 |
| 2016/0066173 | A1 * | 3/2016 | Glazer | H04W 76/14 370/338 |
| 2020/0097095 | A1 * | 3/2020 | Sirpal | G06F 3/017 |
| 2022/0319458 | A1 * | 10/2022 | Jeong | G09G 3/3618 |

FOREIGN PATENT DOCUMENTS

| | | | |
|---|---|---|---|
| KR | 10-2006-0101862 | A | 9/2006 |
| KR | 10-2006-0108207 | A | 10/2006 |
| KR | 10-0765789 | B1 | 10/2007 |
| KR | 10-2009-0059994 | A | 6/2009 |
| KR | 10-2009-0124588 | A | 12/2009 |
| KR | 10-1264318 | B1 | 5/2013 |
| KR | 10-1288325 | B1 | 7/2013 |
| KR | 10-1446090 | B1 | 10/2014 |
| KR | 10-2015-0117959 | A | 10/2015 |
| KR | 10-1748630 | B1 | 6/2017 |
| KR | 10-1896970 | B1 | 9/2018 |
| WO | 2021/033796 | A1 | 2/2021 |

OTHER PUBLICATIONS

Communication dated Mar. 25, 2025, issued by the European Patent Office in European Application No. 23775147.4.
Office Action dated Mar. 16, 2026, issued by intellectual Property India in Indian Patent Application No. 202417068963.

* cited by examiner

| PIECES OF INFORMATION | INFORMATION ABOUT FIRST EXTERNAL DEVICE |
|---|---|
| INFORMATION ABOUT USER INPUT RELATED TO DEVICE TYPE | GAME DEVICE |
| INFORMATION ABOUT DEVICE TYPE | GAME DEVICE |
| INFORMATION ABOUT DEVICE NAME | GAME DEVICE OF USER 100 |
| HISTORY INFORMATION ABOUT REPRODUCED CONTENT | GAME 1, GAME 2 |

ELECTRONIC DEVICE AND METHOD OF DISPLAYING EXTERNAL DEVICE CORRESPONDING TO OPERATION METHOD OF THE ELECTRONIC DEVICE

CROSS-REFERENCE TO RELATED APPLICATIONS

This application is a bypass continuation of International Application No. PCT/KR2023/001469, filed on Feb. 1, 2023, which is based on and claims priority to Korean Patent Application No. 10-2022-0036929, filed on Mar. 24, 2022, the disclosures of which are incorporated by reference herein in their entireties.

BACKGROUND

1. Field

The disclosure relates to an electronic device and an operation method thereof, and more particularly, to an electronic device and an operation method of the electronic device by which the electronic device is adaptively operated according to an operation mode of the electronic device.

2. Description of Related Art

Technological advancements related to the performance of electronic devices have allowed for more diversified functions to be performed with electronic devices. An electronic device may be operated in various operation modes through external devices connected to the electronic device.

When an electronic device is operated in various operation modes through external devices connected to the electronic device, a user may select an external device corresponding to the operation mode. Accordingly, there is a demand for a technology to identify a current operation mode of an electronic device, and provide a user with information about an external device corresponding to the current operation mode of the electronic device, from among a plurality of devices connected to the electronic device.

SUMMARY

Provided are an electronic device and an operation method thereof, by which external devices that are usable in a current operation mode of the electronic device may be automatically detected and pieces of information about the detected external devices may be provided.

According to an aspect of the disclosure, a method of operating an electronic device includes identifying, from among a plurality of preset operation modes, a first operation mode of the electronic device that is currently operating on the electronic device; obtaining information about at least one external device; identifying, from among the at least one external device, a first external device corresponding to the identified first operation mode, based on the information about the at least one external device; and displaying, on a display of the electronic device, identification information about the identified first external device.

The information about the at least one external device may include at least one of information about a device type of the at least one external device, information about a device name of the at least one external device, information about a user input related to the device type of the at least one external device, information about content received from the at least one external device, and information about the content reproduced in the electronic device.

The identifying of the first external device may include identifying the first external device, from among the at least one external device, having a device type corresponding to the identified first operation mode, based on information about a user input related to the device type of the at least one external device.

The identifying of the first external device may include identifying the first external device, from among the at least one external device, having a device type corresponding to the identified first operation mode, based on information about a device type of the at least one external device.

The identifying of the first external device may include identifying the first external device corresponding to the identified first operation mode, based on information about content received from the at least one external device.

The plurality of preset operation modes may include at least one of a movie mode, a game mode, and a music mode.

The identifying of the first external device further may include identifying the first external device, from among the at least one external device, corresponding to the identified first operation mode, based on at least one of whether a type of content received from the at least one external device corresponds to the identified first operation mode, and whether a function related to the identified first operation mode is performed in the electronic device.

When the identified first operation mode is a game mode, the identifying of the first external device may include identifying the first external device, from among the at least one external device, corresponding to the game mode, based on at least one of whether the type of the content received from the at least one external device is game content, and whether at least one of an auto low latency mode (ALLM) function, a variable refresh rate (VRR) function, and a Free Sync function are performed in the electronic device.

The displaying of the identification information on the display may include identifying a panel of the display corresponding to the identified first operation mode, and displaying, on the panel, the identification information about the first external device.

The displaying of the identification information on the display may further include displaying, on the display, at least one of an application, a webpage, and a menu function corresponding to the identified first operation mode, based on history information about the identified first operation mode.

According to another aspect of the disclosure, an electronic device includes: a display; a memory storing one or more instructions; and at least one processor configured to execute the one or more instructions stored in the memory to: identify a first operation mode that is currently operating on the electronic device, from among a plurality of preset operation modes of the electronic device; obtain information about at least one external device; identify, from among the at least one external device, a first external device corresponding to an identified first operation mode, based on the information about the at least one external device; and control the display to display identification information about the identified first external device.

The information about the at least one external device may include at least one of information about a device type of the at least one external device, information about a device name of the at least one external device, information about a user input related to the device type of the at least one external device, information about content received from the at least one external device, and information about the content reproduced in the electronic device.

The at least one processor may be further configured to execute the one or more instructions to identify, from among the at least one external device, the first external device having a device type corresponding to the identified first operation mode, based on information about a user input related to the device type of the at least one external device.

The at least one processor may be further configured to execute the one or more instructions to identify, from among the at least one external device, the first external device having a device type corresponding to the identified first operation mode, based on information about the device type of the at least one external device.

The at least one processor may be further configured to execute the one or more instructions to identify the first external device corresponding to a device list previously stored with respect to the identified first operation mode, based on information about a device name of the at least one external device.

The at least one processor may be further configured to execute the one or more instructions to identify the first device corresponding to the identified first operation mode, based on information about content received from the at least one external device.

The at least one processor may be further configured to execute the one or more instructions to identify, from among the at least one external device, the first external device corresponding to the identified first operation mode, based on at least one of whether a type of content received from the at least one external device corresponds to the identified first operation mode, and whether a function related to the identified first operation mode is performed in the electronic device.

The at least one processor may be further configured to execute the one or more instructions to identify a panel of the display corresponding to the identified first operation mode, and display, on the panel, the identification information about the identified first external device.

According to another aspect of the disclosure, a non-transitory computer-readable recording medium having recorded thereon a program, which when executed by a computer, performs a method includes: identifying, from among a plurality of preset operation modes, a first operation mode of the electronic device that is currently operating on the electronic device; obtaining information about at least one external device; identifying, from among the at least one external device, a first external device corresponding to the identified first operation mode, based on the information about the at least one external device; and displaying, on a display of the electronic device, identification information about the identified first external device.

According to another aspect of the disclosure, an electronic device includes: a memory storing one or more instructions; and at least one processor configured to execute the one or more instructions stored in the memory to: identify a plurality of operation modes corresponding to the electronic device, the plurality of operation modes include at least one of a movie mode, a music mode, a game mode, an Internet mode, a television mode, and a document mode; obtain information about one or more external devices; identify, from among the plurality of operation modes, a first operation mode that is currently operating on the electronic device; identify, from among the one or more external devices, a first external device corresponding to the identified first operation mode, based on the information about the one or more external devices; and control a display to display identification information about the identified first external device.

The information about the one or more external devices may include at least one of information about a type of a device of the one or more external devices, information about a user input related to the type of the device of the one or more external devices, information about content received from the one or more external devices.

The at least one processor may be further configured to execute the one or more instructions to identify, from among the one or more external devices, the first external device having a device type corresponding to the identified first operation mode, based on information about the type of the device of the first external device.

According to one or more embodiments, an electronic device identifies external devices corresponding to the current operation mode of the electronic device and displays identification information about the identified external devices, thereby facilitating the access of a user to the external devices corresponding to a current operation mode of the electronic device.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
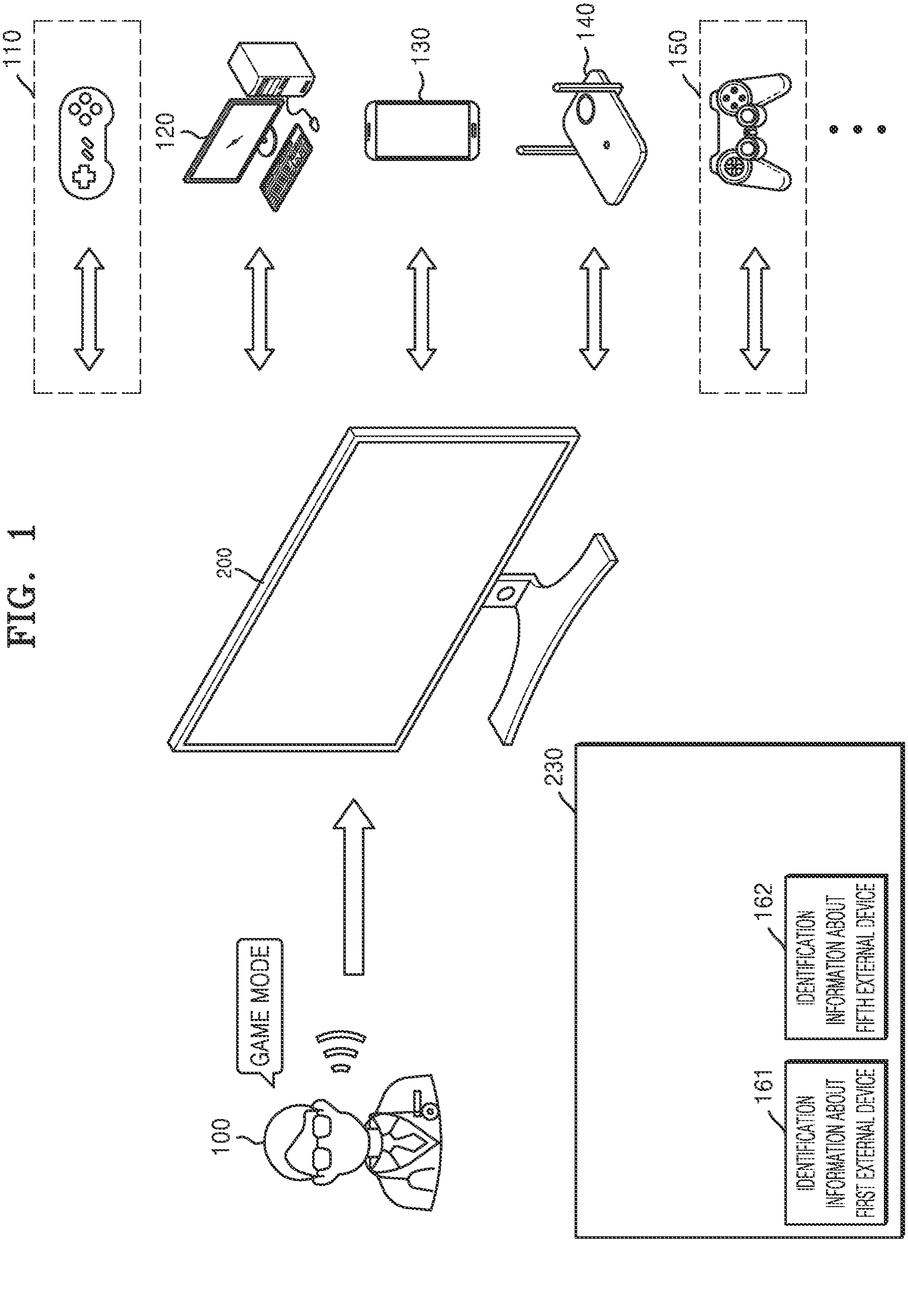
FIG. 1 is a view illustrating an operating method of an electronic device, according to an embodiment of the disclosure.

Throughout the disclosure, the expression "at least one of a, b or c" indicates only a, only b, only c, both a and b, both a and c, both b and c, all of a, b, and c, and/or variations thereof.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

When a part may "include" a certain constituent element, unless specified otherwise, it may not be construed to exclude another constituent element but may be construed to further include other constituent elements. Furthermore, terms such as " . . . unit" and the like, stated in the specification, may signify software or a hardware element such as a field-programmable gate array (FPGA), or an application-specific integrated circuit (ASIC), and may perform a function. However, the " . . . unit" and the like is not limited to software or hardware. The " . . . unit" and the like may be configured to be located in a storage medium to be addressed or configured to be able to operate one or more processors. Accordingly, as an example, the " . . . unit" and the like includes constituent elements such as software constituent elements, object-oriented software constituent elements, class constituent elements, and task constituent elements, processes, functions, attributes, procedures, subroutines, segments of program codes, drivers, firmware, micro codes, circuits, data, databases, data structures, tables, arrays, and variables. The constituent elements and functions provided by the " . . . unit" and the like may be combined into a smaller number of constituent elements and the " . . . unit" and the like or may be further divided into additional constituent elements and the " . . . unit" and the like.

The disclosure will now be described more fully with reference to the accompanying drawings, in which embodiments of the disclosure are shown. In the following description, when detailed descriptions about related well-known functions or structures are determined to make the gist of the disclosure unclear, the detailed descriptions will be omitted herein. Throughout the drawings, like reference numerals denote like elements.

In the specification, when a constituent element "connects" or is "connected" to another constituent element, the constituent element contacts or is connected to the other constituent element not necessarily directly, but also electrically through at least one of other constituent elements interposed therebetween. Also, when a part may "include" a certain constituent element, unless specified otherwise, it may not be construed to exclude another constituent element but may be construed to further include other constituent elements.

In the specification, information about an external device may refer to information used to identify whether the external device corresponds to an operation mode of the electronic device. The information about an external device may include at least one piece of information about a device type of an external device, information about a device name of an external device, information about a user input related to the device type of an external device, and history information about content received from an external device and reproduced in the electronic device.

In the specification, identification information about an external device may mean identification information to distinguish an external device from another external device. The identification information about an external device may correspond to the information about an external device, but the disclosure is not limited thereto. For example, the identification information about an external device may include an abbreviation preset by a user for an external device or a serial number that is an intrinsic product identification number assigned according to a product release order.

Hereinafter, the disclosure is described in detail with reference to the accompanying drawings.

FIG. 1 is a view illustrating an operation method of an electronic device, according to an embodiment of the disclosure.

Referring to FIG. 1, an electronic device 200 according to an embodiment of the disclosure may display identification information about external device corresponding to a current operation mode of the electronic device 200, on a display 230 of the electronic device 200.

The electronic device 200, according to an embodiment of the disclosure, may identify the current operation mode of the electronic device 200 from among a plurality of preset operation modes of the electronic device 200. For example, the electronic device 200 may identify the current operation mode of the electronic device 200, and identify an operation mode corresponding to the current operation mode. Referring to FIG. 1, the electronic device 200 may receive an utterance such as "game mode," as a user input, from a user 100, and thus, it may be identified that the operation mode of the electronic device 200 is a game mode.

In the specification, the preset operation modes may be operation modes related to functions to be operated in the electronic device 200. The operation modes may include at least one of a game mode for outputting game content, a music mode for outputting music content, and/or a movie mode for outputting movie content, but the disclosure is not limited thereto. For example, the electronic device 200 may be used in a mode of browsing a document stored in an external device connected thereto, and the operation modes may further include a document mode.

The electronic device 200, according to an embodiment of the disclosure, may obtain information about at least one external device located in the vicinity of the electronic device 200. At least one external device may include various electronic devices electrically connected to the electronic device 200. For example, the electronic device 200 may obtain information about at least one external device through a communication unit 250 (see FIG. 3). Furthermore, the electronic device 200 may obtain information about at least one external device through an external device interface unit 240 (see FIG. 3), but the disclosure is not limited thereto. For example, the electronic device 200 may identify information about at least one external device that is previously stored in a memory 210 (see FIG. 3). Referring to FIG. 1, the at least one external device may include a first external device 110, a second external device 120, a third external device 130, a fourth external device 140, and a fifth external device 150.

The electronic device 200, according to an embodiment of the disclosure, may identify an external device corresponding to the current operation mode of the electronic device 200 from among the at least one external device.

For example, the electronic device 200, according to an embodiment, may identify an external device corresponding to the current operation mode of the electronic device 200, from among the at least one external device, based on the obtained information about at least one external device. The external device corresponding to the current operation mode of the electronic device 200 may denote a device that may be connected to the electronic device 200 and used together in the current operation mode of the electronic device 200. For example, the external device corresponding to the current operation mode of the electronic device 200 may include a device that may provide contents to the electronic device 200 in the current operation mode of the electronic device 200, control contents processed in the current operation mode of the electronic device 200, or receive the processed contents in the current operation mode of the electronic device 200.

Referring to FIG. 1, information about the first external device 110 may include that the device type of the first external device 110 is a game device, and the information about the fifth external device 150 may include history information about a game application received from the fifth external device 150 and executed in the electronic device 200. Accordingly, the electronic device 200 may identify the first external device 110 and the fifth external device 150 as external devices corresponding to a game mode, based on the information about the first external device 110 and the information about the fifth external device 150. Unlike the above, the electronic device 200 may identify the second external device 120, the third external device 130, and the fourth external device 140 as devices not corresponding to a game mode, based on information about the second external device 120, information about the third external device 130, and information about the fourth external device 140.

The electronic device 200 may display identification information about at least one external device corresponding to the current operation mode of the electronic device 200 on the display 230 of the electronic device 200. For example, referring to FIG. 1, when the electronic device 200 identifies the first external device 110 and the fifth external device 150 as external devices corresponding to the current operation mode of the electronic device 200, identification information 161 about the first external device 110 and identification information 162 about the fifth external device 150 on the display 230 of the electronic device 200. In detail, the identification information 161 about the first external device 110 and the identification information 162 about the fifth external device 150 may each include the device model name, model number, name, and the like of the first external device 110 and the fifth external device 150.

The electronic device 200 may display the identification information 161 about the first external device 110 and the identification information 162 about the fifth external device 150. Accordingly, the electronic device 200 may provide external devices to be used according to the current operation mode, without manually setting or inputting external devices by a user.

Figure 2:
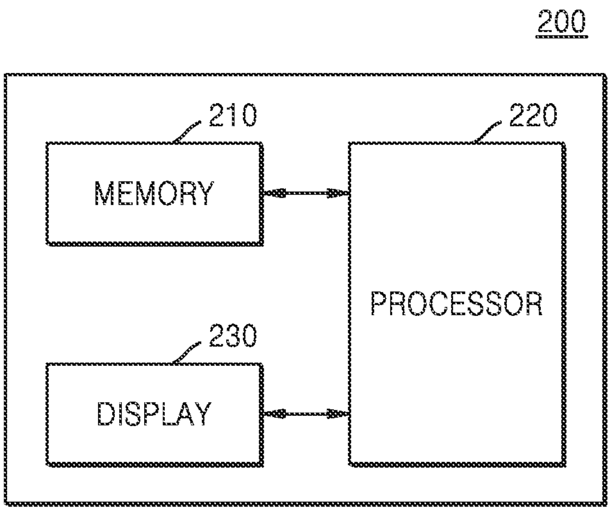
FIG. 2 is a block diagram illustrating a configuration of an electronic device, according to an embodiment of the disclosure.

FIG. 2 is a block diagram of the configuration of an electronic device, according to an embodiment of the disclosure.

The electronic device 200, according to an embodiment of the disclosure, may an electronic device for displaying an external device corresponding to the operation mode of the electronic device 200. The electronic device 200 according to an embodiment of the disclosure may include the memory 210, a processor 220, and the display 230. These elements are described below.

The memory 210 may store programs for processing and control of the processor 220. The memory 210 according to an embodiment of the disclosure may store one or more instructions to perform an operation of displaying external devices corresponding to the operation mode of the electronic device 200.

The processor 220 may control the overall operation of the electronic device 200, and control the operation of the electronic device 200 by executing the one or more instructions stored in the memory 210.

The processor 220, according to an embodiment of the disclosure, by executing the one or more instructions stored in the memory 210, may identify the current operation mode of the electronic device 200 among a plurality of preset operation modes of the electronic device 200, and may obtain information about at least one external device. The processor 220, by executing the one or more instructions stored in the memory 210, may identify an external device corresponding to the identified operation mode from among the at least one external device, based on the information about the at least one external device, and control the display 230 to display identification information about the identified external device.

The processor 220, according to an embodiment of the disclosure, by executing the one or more instructions stored in the memory 210, may identify an external device having a device type corresponding to the identified operation mode from among the at least one external device, based on the information about a user input related to the device type of the at least one external device.

The processor 220 according to an embodiment of the disclosure, by executing the one or more instructions stored in the memory 210, may identify an external device having a device type corresponding to the identified operation mode from among the at least one external device, based on the information about the device type of the at least one external device.

The processor 220, according to an embodiment of the disclosure, by executing the one or more instructions stored in the memory 210, may identify an external device included in a device list previously stored with respect to the identified operation mode, based on the information about the device name of the at least one external device.

The processor 220, according to an embodiment of the disclosure, by executing the one or more instructions stored in the memory 210, may identify an external device corresponding to the identified operation mode, based on the history information about content received from the at least one external device and reproduced in the electronic device.

The processor 220, according to an embodiment of the disclosure, by executing the one or more instructions stored in the memory 210, may identify an external device corresponding to the identified operation mode from among the at least one external device, based on at least one of whether the type of content received from the at least one external device and reproduced in the electronic device 200 corresponds to the identified operation mode and whether a function related to the identified operation mode is performed in the electronic device 200.

The processor 220, according to an embodiment of the disclosure, by executing the one or more instructions stored in the memory 210, identify a panel (user interface) of the display 230 corresponding to the identified operation mode, and display, on the identified panel, the identification information about the identified external device.

The display 230 may display a certain screen under the control of the processor 220. In detail, the display 230 may display, on the identified panel of the display 230, the identification information about an external device corresponding to the operation mode of the electronic device 200.

The display 230 may include a display panel and a controller for controlling the display panel, and the display 230 may be a display built in the electronic device 200. The display panel may be implemented by various types of displays, such as a liquid crystal display (LCD), an organic light-emitting diode (OLED) display, an active-matrix organic light-emitting diode (AM-OLED) display, a plasma display panel (PDP), and the like. The display panel may be implemented to be flexible, transparent, or wearable. The display 230 may be combined with a touch panel of a user input unit 260 and provided as a touch screen. For example, the touch screen may include an integrated module in which the display panel and the touch panel are combined with each other in a stack structure.

However, the illustrated constituent elements are not all essential constituent elements. The electronic device 200 may be implemented by more constituent elements than the illustrated constituent elements, or less constituent elements than the illustrated constituent elements. For example, as illustrated in FIG. 3, the electronic device 200 may include the memory 210, the processor 220, the display 230, the external device interface unit 240, the communication unit 250, and the user input unit 260.

Figure 3:
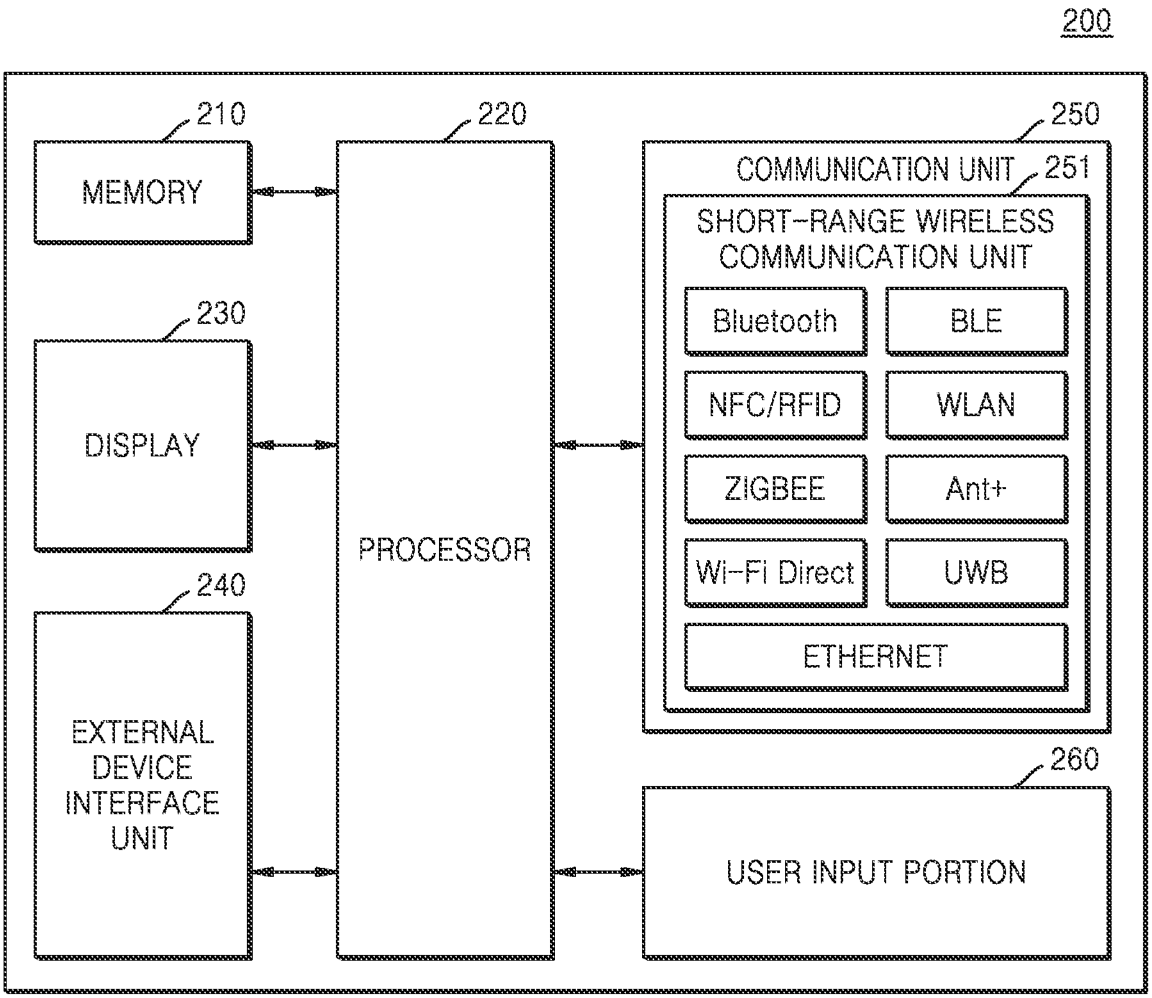
FIG. 3 is a block diagram illustrating a detailed configuration of an electronic device, according to an embodiment of the disclosure.

FIG. 3 is a block diagram of a detailed configuration of an electronic device, according to an embodiment of the disclosure.

The electronic device 200, according to an embodiment of the disclosure, may be an electronic device for displaying an external device corresponding to the current operation mode of the electronic device 200. The electronic device 200 may include computing devices, such as a smart phone, a laptop computer, a desktop computer, a personal digital assistance (PDA), a tablet personal computer (PC), and the like, but the disclosure is not limited thereto. Furthermore, the electronic device 200 may include the memory 210, the processor 220, the display 230, the external device interface unit 240, the communication unit 250, and the user input unit 260. The constituent elements described above are described below. The description of the display 230, which is the same as that presented above with reference to FIG. 2, is omitted.

The memory 210 may store programs for processing and control of the processor 220. The memory 210, according to an embodiment of the disclosure, may store one or more instructions. The memory 210 may include at least one of an internal memory and an external memory. For example, the memory 210 may include information about at least one external device, identification information about at least one external device located in the vicinity of the electronic device 200, and information about a plurality of operation modes related to the operation of the electronic device 200. Furthermore, the memory 210 may include information about a function related to a plurality of operation modes.

The internal memory may include at least one of, for example, volatile memories, such as dynamic random access memory (DRAM), static RAM (SRAM), synchronous dynamic RAM (SDRAM), and the like, non-volatile memories, such as one time programmable read-only memory (OTPROM), programmable ROM (PROM), erasable and programmable ROM (EPROM), electrically erasable and programmable ROM (EEPROM), mask ROM, flash ROM, and the like, hard disk drives (HDD), or solid state drives (SSD). According to an embodiment of the disclosure, the processor 220 may process a command or data received from at least one of a non-volatile memory or other constituent elements by loading the same in the volatile memory. Furthermore, the processor 220 may retain data received from other constituent elements or generated, in the non-volatile memory.

The external memory may include at least one of, for example, a compact flash (CF) card, a secure digital (SD) card, a micro secure digital (Micro-SD) card, a mini secure digital (Mini-SD) card, an extreme digital (xD) card, Memory Stick, and the like.

The processor 220 may control the overall operation of the electronic device 200, and may control the operation of the electronic device 200 by executing the one or more instructions stored in the memory 210. For example, the processor 220, by executing the programs stored in the memory 210, may generally control the memory 210, the display 230, the external device interface unit 240, the communication unit 250, the user input unit 260, and the like.

The processor 220 may include at least one of RAM, ROM, a central processing unit (CPU), a graphics processing unit (GPU), and a bus. RAM, ROM, CPU, GPU, and the like may be connected with each other via a bus. According to an embodiment of the disclosure, the processor 220 may include an artificial intelligence dedicated processor for identifying a first external device corresponding to the current operation mode of the electronic device 200 from among the at least one external device, based on the information about at least one external device. According to an embodiment of the disclosure, the artificial intelligence dedicated processor may be implemented by the processor 220 and a separate chip, and the artificial intelligence dedicated processor may be a general purpose chip.

In detail, the artificial intelligence dedicated processor may control input data to be processed according to predefined operation rules stored in the memory 210 or artificial intelligence models, or may be designed in a hardware structure specialized to the processing of a specific artificial intelligence model.

The predefined operation rules or artificial intelligence models may be made through learning, and being made through learning means that, as a basic artificial intelligence model is trained by a learning algorithm using a plurality of pieces of learning data, predefined operation rules or artificial intelligence models set to perform desired features or purposes are made. Such learning may be made in a device in which artificial intelligence according to the disclosure is performed, or through a separate server and/or system.

The external device interface unit 240 may provide an interface environment between the electronic device 200 and various external devices. The external device interface unit 240 may include an A/V input/output unit. The external device interface unit 240 may be connected, in a wired/wireless manner, to an external device and the like, such as a digital versatile disc (DVD) player, a Blue-ray disc, a game device, a camera, a computer, an air conditioner, a notebook computer, a desktop computer, a television, a digital display device, and the like. The external device interface unit 240 may transmit an image, video, or voice signal input through the connected external device, and information about the external device, to the processor 220 of the electronic device 200. The A/V input/output unit may include a universal serial bus (USB) terminal, a composite video banking sync (CVBS) terminal, a component terminal, an S-video terminal (analog), a digital visual interface (DVI) terminal, a high definition multimedia interface (HDMI) terminal, a display port (DP), Thunderbolt, a red, green, and blue (RGB) terminal, a D-subminiature (D-SUB) terminal, and the like, to input the information about an external device to the electronic device 200.

The electronic device 200, according to an embodiment of the disclosure, may obtain information about an external device through the external device interface unit 240. In detail, the electronic device 200 may receive HDMI connection information through a HDMI terminal connected to the external device, and the received HDMI connection information may include information about a device type, a device name, and the like. However, the disclosure is not limited thereto, and the electronic device 200 may be connected to the external device via Thunderbolt and the like.

The communication unit 250 may perform communication with at least one external device through a wired or wireless communication network. The communication unit 250 may include one or more constituent elements for communication between the electronic device 200 and a plurality of devices or server located in the vicinity of the electronic device 200. The communication unit 250 may include one or more constituent elements for communication between the electronic device 200 and a server. Furthermore, the communication unit 250 may include a short-range wireless communication unit 251. The communication unit 250 according to an embodiment of the disclosure may communicate with the external device located in the vicinity of the electronic device 200 under the control of the processor 220, and the communication unit 250 may transmit signals indicating information about an external device to the external device. Accordingly, the electronic device 200 may receive information about at least one external device from the at least one external device connected to the electronic device 200 through the communication unit 250.

The short-range wireless communication unit 251 may include a Bluetooth communication unit, a Bluetooth low energy (BLE) communication unit, a near field communication unit, a Wi-Fi (WLAN) communication unit, a Zigbee communication unit, an infrared data association (IrDA) communication unit, a Wi-Fi direct (WFD) communication unit, an ultra-wideband (UWB) communication unit, an Ant+ communication unit, an Ethernet communication unit, and the like, but the disclosure is not limited thereto.

Furthermore, the communication unit 250 may further include a long-range communication module for communicating with a server to support a long-range communication according to a long-range communication protocol. In detail, the communication unit 250 may include a long-range communication module for performing communication through a network for the Internet communication. Furthermore, the communication unit 250 may include a long-range communication module for performing communication through a communication network according to a communication protocol, such as 3G, 4G, 5G, and/or like. Furthermore, the communication unit 250 may include at least one port to be connected to an external device via a wired cable to communicate with the external device in a wired manner. Accordingly, the communication unit 250 may perform communication with the external device connected by wire through the at least one port.

The user input unit 260 may receive various instructions as an input from a user, and may mean an input device for the user to control the electronic device 200. The user input unit 260 may include at least one of a keypad, a dome switch, a touch pad (a contact-type capacitive method, a pressure-type resistance film method, an infrared detection method, a surface ultrasound conductive method, an integral tension measurement method, a piezo-effect method, and the like), a jog wheel, and a jog switch, but the disclosure is not limited thereto. The keypad may include various types of keys, such as a mechanical button, a wheel, and the like, formed in various areas, such as a front surface portion, a side surface portion, a rear surface portion, and the like of a main body of the electronic device 200. The touch panel may detect a user's touch input, and output a touch event value corresponding to a detected touch signal. When the touch panel is coupled to the display panel to form a touch screen, the touch screen may be implemented by various types of touch sensors, such as an electrostatic type, a pressure-sensitive type, a piezoelectric type, and the like. According to an embodiment of the disclosure, a threshold value may be adaptively adjusted through the user input unit 260, but the disclosure is not limited thereto.

In detail, the user input unit 260 may include a user input device including a touch panel for detecting a user's touch, a button for receiving a user' push operation, a mouse or keyboard for specifying or selecting a point on a user interface screen, and the like, but the disclosure is not limited thereto. Furthermore, the user input unit 260 may include a voice recognition device for voice recognition. For example, the voice recognition device may be a microphone, and the voice recognition device may receive a user's voice command or voice request. Accordingly, the processor 220 may control the overall operation of the electronic device 200 to perform an operation corresponding to a voice command or voice request.

The electronic device 200, according to an embodiment of the disclosure, may receive a user input related to the device type of an external device located in the vicinity of the electronic device 200, through the user input unit 260. Accordingly, the electronic device 200 may identify whether the external device is one corresponding to the current operation mode of the electronic device 200, based on information about a user input related to the device type of an external device.

Figure 4:
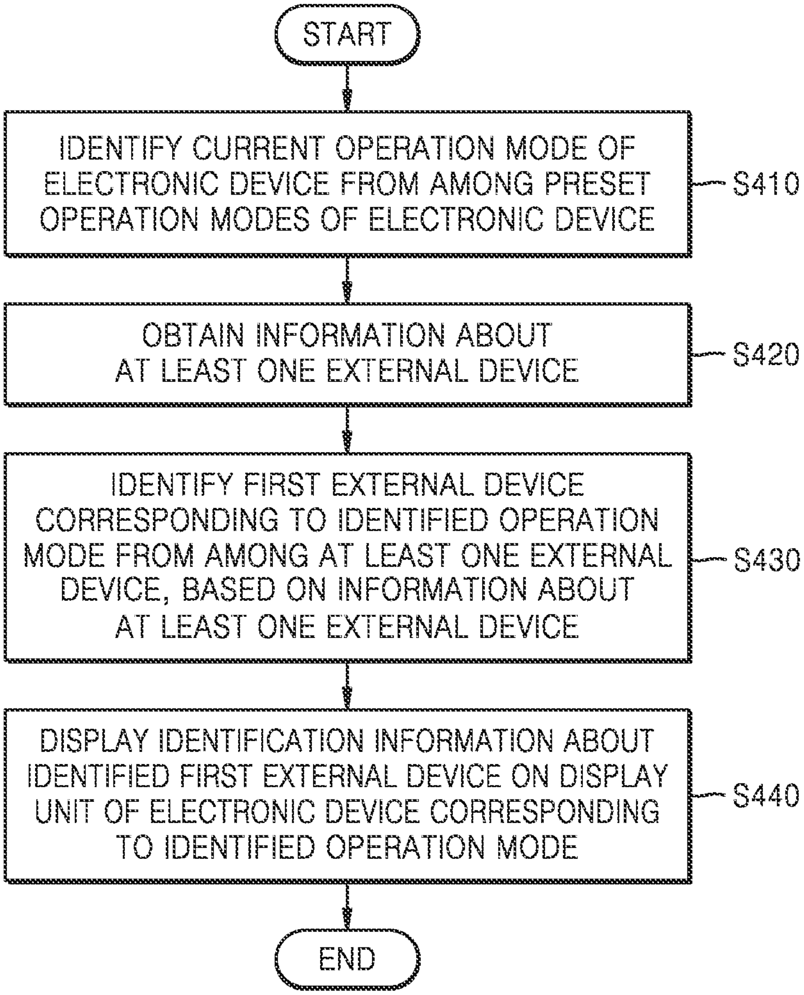
FIG. 4 is a flowchart illustrating an operation method of an electronic device, according to an embodiment of the disclosure.

FIG. 4 is a flowchart of an operation method of an electronic device, according to an embodiment of the disclosure.

Referring to FIG. 4, in operation S410, an electronic device, according to an embodiment of the disclosure, may identify a current operation mode of the electronic device from among a plurality of preset operation modes of the electronic device.

For example, the electronic device 200, according to an embodiment of the disclosure, may identify a current operation of the electronic device 200, and identify a current operation mode of the electronic device 200 based on the current operation of the electronic device 200. The electronic device 200 may identify the current operation mode of the electronic device 200 from among the preset operation modes, according to a user's input of an operation mode of the electronic device 200. In detail, the electronic device 200 may receive an input of the operation mode of the electronic device 200 through a portable terminal and the like connected to the electronic device 200, and thus determine the operation mode of the electronic device 200, but the disclosure is not limited thereto.

In the specification, the preset operation modes may include the operation modes of the electronic device 200 previously stored in the memory 210 of the electronic device 200. A new operation mode may be stored in the memory 210 through the user input unit 260, and the preset operation modes may include at least one of a movie mode, a music mode, a game mode, an Internet mode, a television mode, and a document mode used for a document task.

In operation S420, an electronic device, according to an embodiment of the disclosure, may obtain information about at least one external device.

The electronic device 200 may obtain information about at least one external device from the constituent elements of the electronic device 200. The at least one external device may be a device electrically connected to the electronic device 200, and may mean an electronic device located in the vicinity of the electronic device 200. The electronic device 200 may obtain information about the at least one external device through the external device interface unit 240. In detail, there may be an external device connected to the electronic device 200 through the HDMI terminal of the electronic device 200, and the electronic device 200 may receive HDMI connection information through the HDMI terminal. The HDMI connection information may include information about a device type, a device model name, a device model number, a device name, and the like of the external device connected through the HDMI terminal.

In another example, the electronic device 200 may obtain information about the at least one external device through the communication unit 250. In this state, the electronic device 200 may transmit a signal to request information about an external device to the external device, and the electronic device 200 may receive information about the external device from the external device.

The at least one external device may be connected to the electronic device 200 through the communication unit 250, the external device interface unit 240, or the like, and the at least one external device may be connected to the electronic device 200 through different constituent elements of the electronic device 200.

In the specification, the information about an external device may include all pieces of information used to identify an external device corresponding to the operation mode of the electronic device 200. For example, the information about an external device may include at least one piece of information about the device type of an external device, information about the device model name of an external device, information about the device model number of an external device, information about the device name of an external device, the information about a user input related to the device type of an external device, and history information about the content received from the external device and reproduced in the electronic device.

In operation S430, an electronic device, according to an embodiment of the disclosure, may identify a first external device corresponding to the identified operation mode from among at least one external device, based on the information about at least one external device.

The electronic device 200 may identify the first external device corresponding to the current operation mode of the electronic device 200, based on the information about at least one external device. For example, a user may previously store the device type of an external device as a movie mode, through the user input unit 260. In this state, when the operation mode of the electronic device 200 is identified as a movie mode, the electronic device 200 may identify the device type as a movie mode, and identify the previously stored external device as a device corresponding to the movie mode.

Furthermore, the electronic device 200 may identify may identify whether the external device corresponds to the current operation mode of the electronic device 200, based on at least one of whether the type of content received from an external device and reproduced in the electronic device corresponds to the identified operation mode and whether a function related to the identified operation mode is performed in the electronic device 200.

The operation of identifying whether the external device is a device corresponding to the current operation mode of the electronic device 200 is described below in detail with reference to FIGS. 6 to 8.

In operation S440, an electronic device, according to an embodiment of the disclosure, may display identification information about an identified external device on a display of the electronic device corresponding to an identified operation mode.

The electronic device 200, according to an embodiment of the disclosure, may display identification information about an external device corresponding to the current operation mode of the electronic device 200 on the display 230 of the electronic device 200. In the disclosure, the identification information about an external device may mean identification information used to identify an external device from another external device.

The display 230 of the electronic device 200 may include a plurality of panels (user interfaces) corresponding to a plurality of operation modes corresponding to an electronic device. The panel corresponding to the operation mode of an electronic device may shows an example of a user interface for providing a list of external devices usable in the corresponding operation mode of an electronic device and a menu or items used in the corresponding operation mode, according to a preset format. The electronic device 200 may identify a panel corresponding to the current operation mode of the electronic device 200, and display identification information about at least one external device, on the identified panel. Accordingly, the user may easily access an external device corresponding to the current operation mode of the electronic device 200.

In an embodiment of the disclosure, the panel of the electronic device 200 may include a common panel. In the specification, the common panel may mean a panel including information about all external devices connected to the electronic device 200, applications, webpages, menu functions, and the like. In this state, the electronic device 200 may control the display 230 to display information about an external device corresponding to the current operation mode of the electronic device 200, and the like on an upper end of the common panel. Accordingly, the user may easily access an external device corresponding to the current operation mode of the electronic device 200.

The method of displaying identification information about an external device on the panel of the electronic device 200 is described below in detail with reference to FIGS. 9 and 10.

Figure 5:
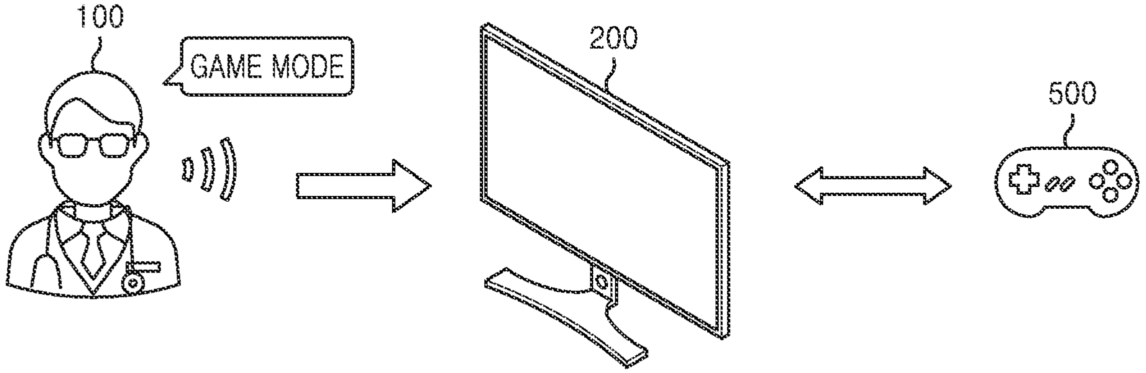
FIG. 5 is a view illustrating information about an external device, according to an embodiment of the disclosure.

FIG. 5 is a view illustrating information about an external device, according to an embodiment of the disclosure The information about an external device, according to an embodiment of the disclosure, may include pieces of information about the external devices. For example, the information may include at least one piece of information about the device type of an external device, information about the device name of an external device, information about a user input related to the device type of an external device, and history information about the content received from the external device and reproduced in the electronic device.

The electronic device 200 may receive "game mode" from a user 100 as a user input of an operation mode, and the electronic device 200 may obtain information about a first external device 500 among at least one external device.

For example, referring to FIG. 5, the information about the first external device 500 may include information that the device type of the first external device 500 is a game device and information that a user input related to the device type of the first external device 500 is a game device. Furthermore, when a user stores the device name of the first external device 500 as a game device of the user 100, information about the device name of the first external device 500 may be the game device of the user 100. Furthermore, the information about the first external device 500 may include history information about Game 1 and game 2 received from the first external device 500 and reproduced in the electronic device 200.

The electronic device 200 according to an embodiment of the disclosure may determine that the current operation mode of the electronic device 200 corresponds to a game mode based on the information about the first external device 500

Figure 6:
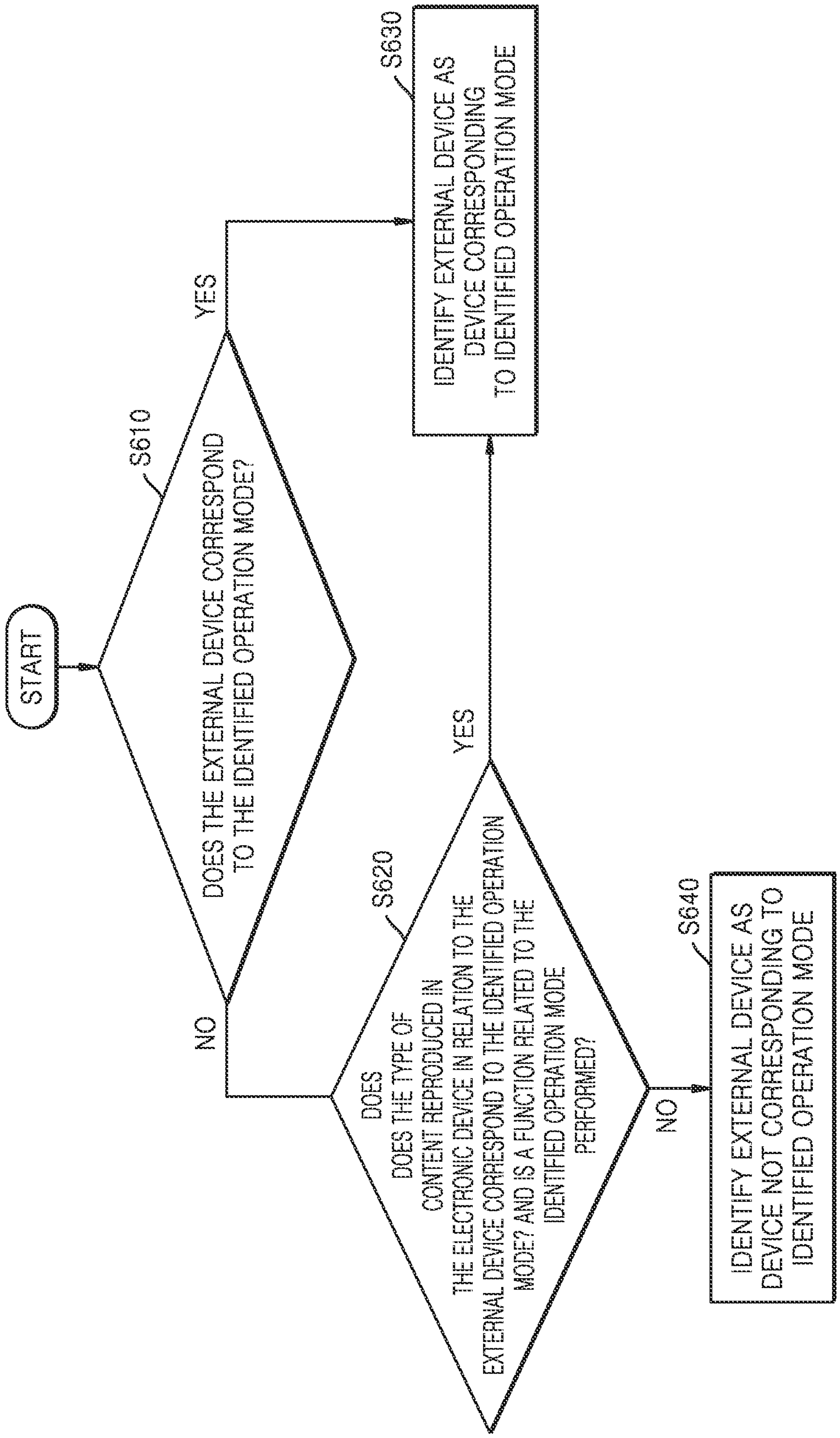
FIG. 6 is a flowchart illustrating a method of identifying an external device corresponding to an operation mode of an electronic device, according to an embodiment of the disclosure.

FIG. 6 is a flowchart illustrating a method of identifying an external device corresponding to an operation mode of an electronic device, according to an embodiment of the disclosure.

The electronic device 200, according to an embodiment of the disclosure, may identify whether the external device is a device corresponding to the current operation mode of the electronic device 200, based on the information about at least one external device. Furthermore, the electronic device 200 may identify whether the external device is a device corresponding to the current operation mode of the electronic device 200, based on the type of content received from the external device and reproduced in the electronic device 200 or whether a function related to the current operation mode of the electronic device 200 is performed. A method of identifying an external device corresponding to the operation mode of the electronic device 200 is described below in detail.

In operation S610, the electronic device 200 may identify whether the external device is a device corresponding to the identified operation mode, based on the information about an external device.

The electronic device 200, according to an embodiment of the disclosure, may identify that the external device is a device corresponding to the identified operation mode, based on the information about an external device (Operation S630). Conversely, the electronic device 200 may not identify that the external device is a device corresponding to the identified operation mode, based on the information about an external device. In this state, the electronic device 200 may identify whether the external device is a device corresponding to the current operation mode of the electronic device 200, based on the type of content received from the external device and reproduced in the electronic device 200 or whether a function related to the current operation mode of the electronic device 200 is performed (Operation S620).

For example, the information about an external device may include information that the external device is an OTT device used to watch a movie. When the current operation mode of the electronic device 200 is a movie mode, the electronic device 200 may determine that the external device is a device corresponding to the move mode that is the current operation mode of the electronic device 200. Conversely, when the current operation mode of the electronic device 200 is a document mode, the electronic device 200 may determine that the electronic device 200 is a device not corresponding to the document mode that is the current operation mode of the electronic device 200, based on the information about an external device. A detailed embodiment of identifying whether the external device is a device corresponding to the identified operation mode, based on the information about an external device, is described below with reference to FIG. 7.

In operation S620, the electronic device 200 may identify whether the external device corresponds to the current operation mode of the electronic device 200, based on whether the type of content received from an external device and reproduced in the electronic device corresponds to the identified operation mode and whether a function related to the identified operation mode is performed.

There may be a case in which the electronic device 200 has difficulty identifying whether the external device corresponds to the current operation mode of the electronic device 200, based on the information about an external device. In this state, the electronic device 200 may identify whether the external device corresponds to the current operation mode of the electronic device 200, by using the type of content received from an external device and reproduced in the electronic device 200. Furthermore, according to the device type of an external device, the electronic device 200 may perform a specific function or change an environment setting value. Accordingly, the electronic device 200 may identify whether the external device corresponds to the operation mode of the electronic device 200, based on whether a function related to the operation mode is performed.

The electronic device 200, according to an embodiment of the disclosure, may identify that the external device is a device corresponding to the identified operation mode, based on whether the type of content received from an external device and reproduced in the electronic device corresponds to the identified operation mode and whether a function related to the identified operation mode is performed (Operation S630). Conversely, it may be identified that the type of content received from an external device and reproduced in the electronic device does not correspond to the operation mode of the electronic device, and that the function performed in the operation mode of the electronic device is currently off in the electronic device 200. In this state, the electronic device 200 may identify that the external device is a device not corresponding to the identified operation mode (Operation S640).

In operation S630, the electronic device 200 may identify that the external device is a device corresponding to the current operation mode of the electronic device 200. Accordingly, the electronic device 200 may display the identification information about the identified external device on the display 230 of the electronic device 200, and the electronic device 200 may automatically provide an external device without inconvenience of setting or inputting manually by a user.

In operation S640, the electronic device 200 may identify that the external device is a device not corresponding to the current operation mode of the electronic device 200. Accordingly, the identification information about an external device may not be displayed on the display 230 of the electronic device 200.

Figure 7:
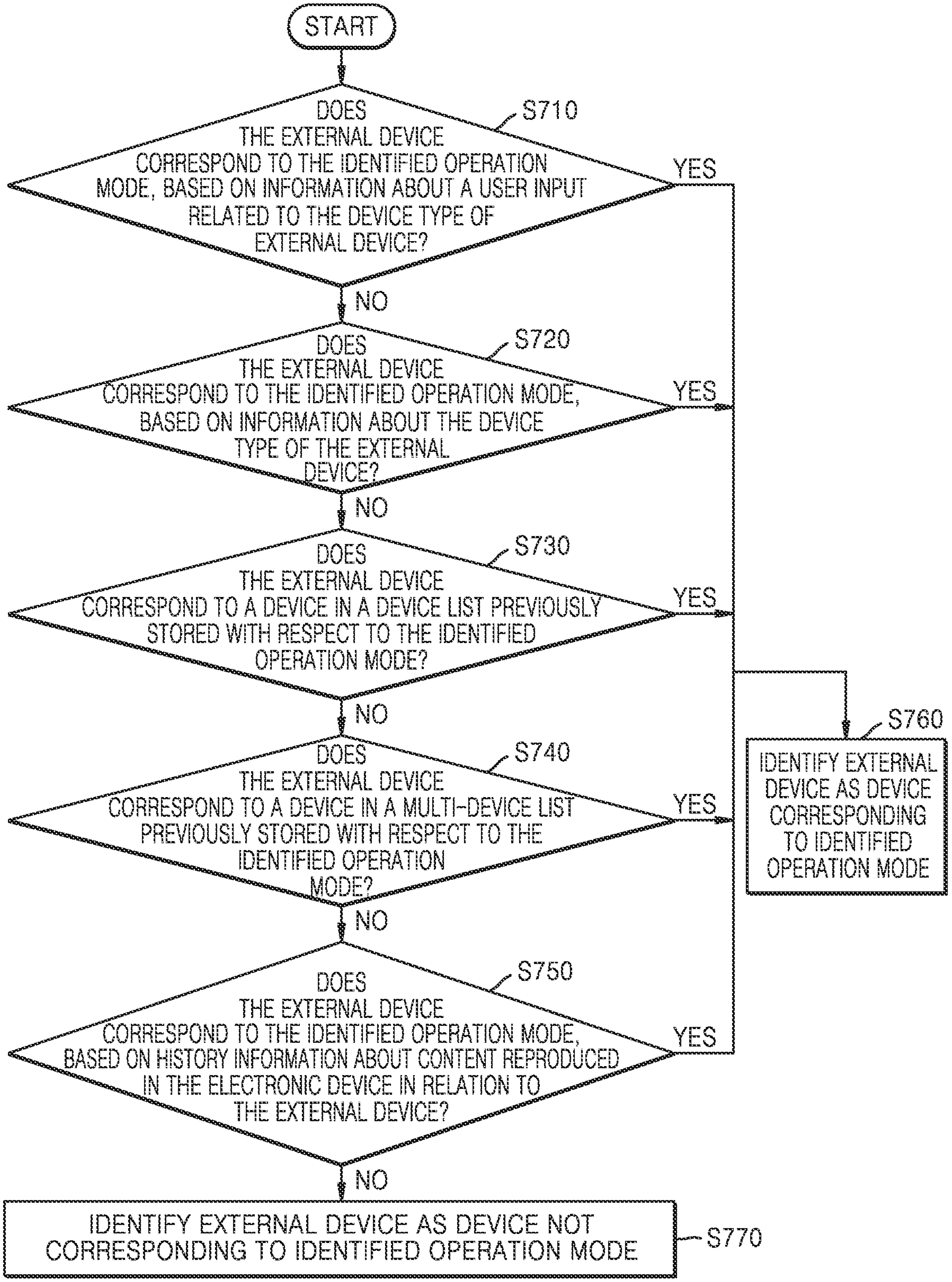
FIG. 7 is a flowchart illustrating a method of determining whether an external device is a device corresponding to a current operation mode of an electronic device, based on information about the external device, according to an embodiment of the disclosure.

FIG. 7 is a flowchart of a method of determining whether an external device is a device corresponding to the current operation mode of the electronic device 200, based on information about the external device, according to an embodiment of the disclosure.

Referring to FIG. 7, the electronic device 200 may identify whether the external device is a device corresponding to the current operation mode of the electronic device 200, based on the information about an external device. In detail, the electronic device 200 may identify whether the external device is a device corresponding to the current operation mode of the electronic device 200, according to Operation S710 to Operation S750. The external device identification methods according to Operation S710 to Operation S750 may be the order of importance, but the disclosure is not limited thereto, and the electronic device 200 may perform the external device identification methods according to Operation S710 to Operation S750 in a different order and/or any order. Furthermore, the electronic device 200 may use at least one of the external device identification methods according to Operation S710 to Operation S750. An embodiment of sequentially performing, by the electronic device 200, the external device identification methods according to Operation S710 to Operation S750 is described below.

In Operation S710, the electronic device 200 may identify whether the external device is a device corresponding to the operation mode of the electronic device 200, based on the information about a user input related to the device type of an external device.

The electronic device 200 may obtain the information about a user input related to the device type of an external device, through the external device interface unit 240, the communication unit 250, the user input unit 260, and the like. Alternatively, the information about a user input related to the device type of an external device may be previously stored in the memory 210.

For example, when the external device is a device operating in a plurality of operation modes, a user may previously store a use method of the external device in the electronic device 200. When a user restricts the device type of an external device to, e.g., a movie mode of the movie mode and a music mode, the electronic device 200 may identify that the external device corresponds to the movie mode that is the current operation mode of the electronic device 200, based on the information about a user input related to the device type of an external device (Operation S760). Conversely, the electronic device 200 may identify that the external device does not correspond to the music mode that is the current operation mode of the electronic device 200, based on the information about a user input related to the device type of an external device. However, referring to FIG. 7, when the external device is not identified to correspond to the current operation mode of the electronic device 200 according to Operation S710, the electronic device 200 may perform the external device identification method according to Operation S720.

In Operation S720, the electronic device 200 may identify whether the external device is a device corresponding to the operation mode of the electronic device 200, based on the information about the device type of an external device.

The electronic device 200 may obtain the information about the device type of an external device, through the external device interface unit 240, the communication unit 250, the user input unit 260, and the like. Alternatively, the information about the device type of an external device may be previously stored in the memory 210. In detail, when the electronic device and the external device are connected to each other through the HDMI terminal, the electronic device 200 may obtain the information about the device type of an external device, through HDMI terminal.

The electronic device 200, according to an embodiment of the disclosure, may identify that the external device is a device corresponding to the operation mode of the electronic device 200, based on the information about the device type of an external device (Operation S760). For example, the device type of an external device may be a game device, and the operation mode of the electronic device 200 may be a game mode. In this state, the electronic device 200 may determine that the external device corresponds to the game mode that is the current operation mode of the electronic device 200, based on the information about the device type of an external device.

Conversely, the electronic device 200 may identify that the external device does not correspond to the operation mode of the electronic device 200, based on the information about the device type of an external device. In this state, the electronic device 200 may additionally perform the method of Operation S730. For example, the device type of an external device may be a game device, and the operation mode of the electronic device 200 may be a movie mode. In this state, the electronic device 200 may determine that the external device does not correspond to the movie mode that is the current operation mode of the electronic device 200, based on the information about the device type of an external device. The electronic device 200 may additionally determine whether the external device corresponds to the current operation mode of the electronic device 200, according to the method of Operation S730.

In Operation S730, the electronic device 200 may identify whether the device name corresponds to a device list previously stored with respect to the current operation mode of the electronic device 200, based on the information about the device name of an external device.

The electronic device 200 may obtain the information about the device name of an external device, through the external device interface unit 240, the communication unit 250, the user input unit 260, and the like, and the information about the device name of an external device may be previously stored in the memory 210. Furthermore, the device list according to the operation mode of an electronic device may be stored in the memory 210. In the specification, the device list may mean a device list according to a specific operation mode and a multi-device list that includes a set of devices usable in two or more operation modes. However, the device list in Operation S730 may show a device list in a specific operation mode of the electronic device 200.

The electronic device 200, according to an embodiment of the disclosure, may identify that the external device is a device corresponding to the operation mode of the electronic device 200, based on the information about the device name of an external device (Operation S760). For example, the device name of an external device may be a "game device A," and the "game device A" may be a device name included in a device list according to the game mode. In this state, the electronic device 200 may determine that the external device corresponds to the game mode that is the current operation mode of the electronic device 200, based on the information about the device name of an external device.

Conversely, the electronic device 200 may identify that the external device does not correspond to the operation mode of the electronic device 200, based on the information about the device name of an external device. In this state, the electronic device 200 may additionally perform the method of Operation S740. For example, the device name of an external device may be a "game device A," and the "game device A" may be a device name not included in the device list related to the movie mode that is the current operation mode of the electronic device 200. In this state, the electronic device 200 may determine that the external device corresponds to the movie mode that is the current operation mode of the electronic device 200, based on the information about the device name of an external device. The electronic device 200 may additionally determine whether the external device corresponds to the current operation mode of the electronic device 200, according to the method of Operation S740.

In Operation S740, the electronic device 200 may identify whether the device name corresponds to the device list previously stored with respect to the current operation mode of the electronic device 200, based on the information about the device name of an external device.

With the recent development of technology, the external device may operate in a plurality of operation modes, and thus, the electronic device 200 may identify whether the device name of an external device is included in a multi-device list according to the current operation mode of the electronic device 200. The electronic device 200 may previously store a multi-device list according to the operation mode in the memory 210. The multi-device list may be adjusted through the user input unit 260.

The electronic device 200 according to an embodiment of the disclosure may identify that the external device is a device corresponding to the operation mode of the electronic device 200, based on the information about the device name of an external device (Operation S760). For example, the device name of an external device may be a "game device A," and the "game device A" may be a device name included in a multi-device list according to the game mode. In this state, the electronic device 200 may determine that the external device corresponds to the game mode that is the current operation mode of the electronic device 200, based on the information about the device name of an external device.

Conversely, the electronic device 200 may identify that the external device does not correspond to the operation mode of the electronic device 200, based on the information about the device name of an external device. In this state the electronic device 200 may additionally perform the method of Operation S750. For example, the device name of an external device may be a "game device A," and the "game device A" may be a device name not included in a multi-device list related to the movie mode that is the current operation mode of the electronic device 200. In this state, the electronic device 200 may determine that the external device corresponds to the movie mode that is the current operation mode of the electronic device 200, based on the information about the device name of an external device. The electronic device 200 may additionally determine whether the external device corresponds to the current operation mode of the electronic device 200, according to the method of Operation S750.

In Operation S750, the electronic device 200 may identify the external device corresponding to the current operation mode of the electronic device 200, based on the history information about the content received from the external device and reproduced in the electronic device.

When there is history of use of the external device in connection with the electronic device 200, the electronic device 200 may store, in the memory 210, history information about content received from the external device and reproduced in the electronic device 200. Alternatively, the electronic device 200 may receive, from the external device, the history information about content received from the external device and reproduced in the electronic device 200.

The electronic device 200, according to an embodiment of the disclosure, may identify that the external device is a device corresponding to the operation mode of the electronic device 200, based on the history information about content received from the external device and reproduced in the electronic device 200 (Operation S760). For example, game content A may be received from the external device and reproduced in the electronic device 200, and the electronic device 200 may store history of the game content A in content history information corresponding to the game mode. Accordingly, the electronic device 200 may identify that the external device corresponds to the game mode that is the operation mode of the electronic device 200.

Conversely, the electronic device 200 may identify that the external device does not correspond to the operation mode of the electronic device 200, based on the history information about content received from the external device and reproduced in the electronic device 200 (Operation S770). For example, when there is no history information about the game content received from the external device and reproduced in the electronic device 200, the electronic device 200 may identify that the external device is not a device corresponding to the game mode.

In Operation S760, the electronic device 200 may identify that the external device is a device corresponding to the current operation mode of the electronic device 200, according to the methods of Operation S710 to Operation S750. The electronic device 200 may display identification information about the identified device on the display 230 of the electronic device 200 to provide the identification information to a user.

In Operation S770, the electronic device 200 may identify the external device as a device not corresponding to the current operation mode of the electronic device 200, according to Operation S710 to Operation S750. In this state, the electronic device 200 may not display the identification information about the identified device on the display 230 of the electronic device 200, and may display other devices corresponding to the current operation mode on the display 230.

Figure 8:
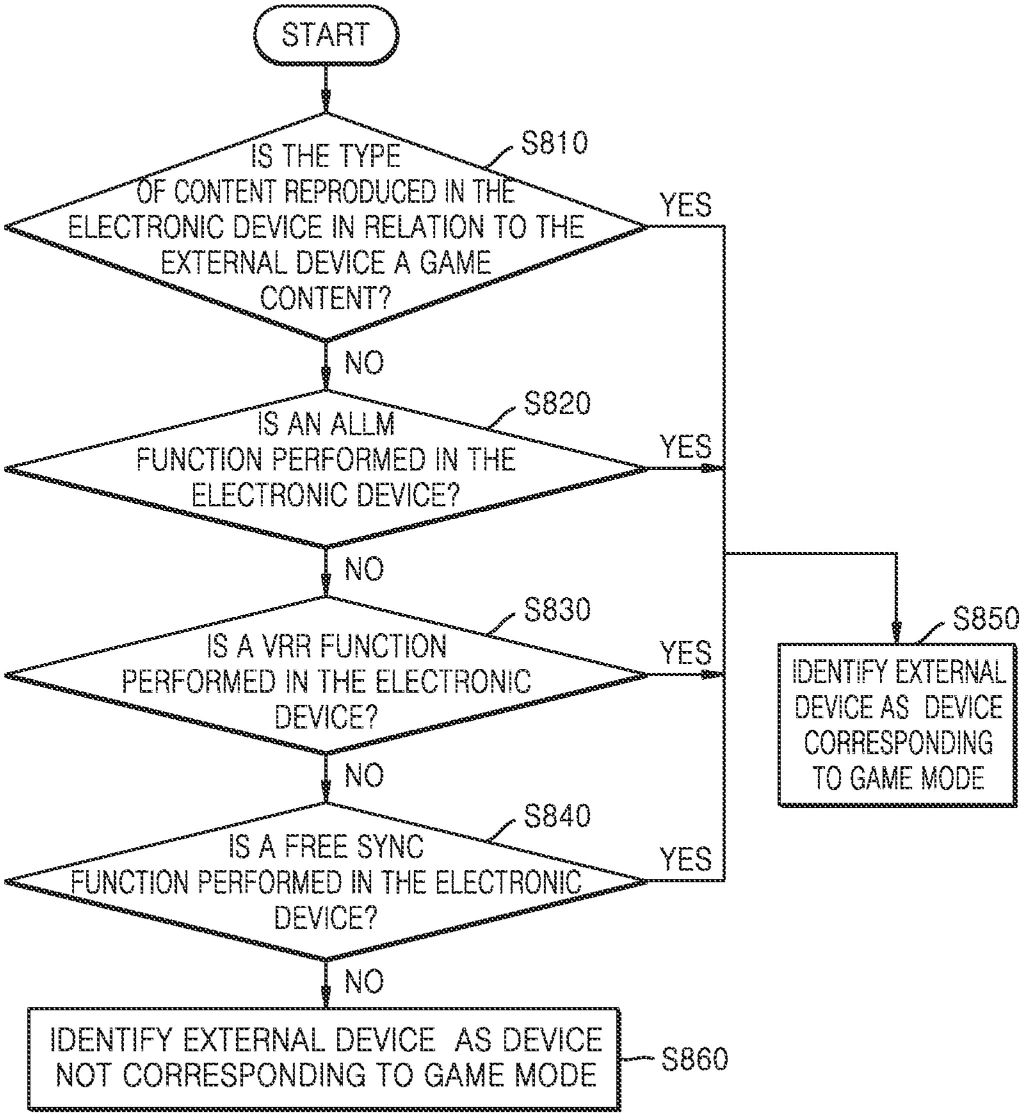
FIG. 8 is a flowchart illustrating a method of determining whether an external device is a device corresponding to a current operation mode of an electronic device, based on a type of content received from at least one external device and reproduced on an electronic device or a function executed on the electronic device, according to an embodiment of the disclosure.

FIG. 8 is a flowchart of a method of determining whether an external device is a device corresponding to a current operation mode of an electronic device, based on a type of content received from at least one external device and reproduced on an electronic device, or a function executed on the electronic device, according to an embodiment of the disclosure.

When there is content received from the external device and currently reproduced in the electronic device, the electronic device 200 according to an embodiment of the disclosure may identify whether the external device corresponds to the current operation mode of the electronic device 200, based on a function of the electronic device 200 according to the content type or content execution.

The electronic device 200 may identify the type of content received from an external device connected to the electronic device 200 and reproduced in the electronic device 200. Furthermore, there may be a function or environment setting activated when the electronic device 200 operates in a specific operation mode, and thus, the electronic device 200 may identify whether the function corresponding to the operation mode of an electronic device is performed in the electronic device 200.

In FIG. 8, an operation of identifying, by the electronic device 200, whether an external device is a device corresponding to a game mode, based on the type of content received from the external device and reproduced in the electronic device 200 or the function performed or activated in the electronic device 200, when the operation mode is a game mode, is described. In the case when the operation mode is not a game mode, similarly to FIG. 8, the electronic device 200 may identify whether the external device is a device corresponding to a game mode, based on the type of content received from the external device and reproduced in the electronic device 200 or the function performed or activated in the electronic device 200.

However, the operation of identifying whether the external device is a device corresponding to a game mode according to Operation S810 to Operation S840 may not all be performed in the electronic device 200, and the order of performing the operations may be changed and may be in any order.

In operation S810, the electronic device 200 may identify whether the type of content received from the external device and reproduced in the electronic device 200 is game content.

For example, when there is content received from an external device connected to the electronic device 200 and reproduced in the electronic device 200, the electronic device 200 may identify information about the content that is reproduced. In detail, when a plurality of contents are reproduced in the electronic device 200, the electronic device 200 may identify content reproduced through the external device, among the contents that are reproduced. The electronic device 200 may identify whether the type of content reproduced in the electronic device 200 is game content. In detail, the electronic device 200 may identify the type of content, based on history information or reproduction information about the content reproduced in the electronic device 200.

When the electronic device 200 identifies the type of content reproduced in the electronic device 200 as game content, the electronic device 200 may identify that the external device is a device corresponding to a game mode (Operation S850). Conversely, when the electronic device 200 identifies the type of content reproduced in the electronic device 200 as content such as a movie, not a game, the electronic device 200 may perform the methods according to Operations S820 to Operation S840.

In Operation S820, Operation S830, and Operation S840, the electronic device 200 may identify whether an auto low latency mode (ALLM) function, a variable refresh rate (VRR) function, and a Free Sync function are performed in the electronic device 200.

As recent game contents are released with high specifications, it is a trend that the electronic device 200 smoothly provides game content by executing various functions. For example, the electronic device 200 may perform an ALLM function that automatically delays an input, or the electronic device 200 may adjust a reproduction rate by using the VRR function. Furthermore, the electronic device 200 may smoothly provide game content by performing the Free Sync function that is an adaptive synchronization technology for a liquid crystal display.

As illustrated in FIG. 8, the electronic device 200 may identify whether the ALLM function, the VRR function, and the Free Sync function are performed in the electronic device 200, but the disclosure is not limited thereto. For example, the electronic device 200 may determine only whether the ALLLM function is performed in the electronic device 200, or whether other functions related to the game mode is performed in the electronic device 200.

When the electronic device 200 identifies that at least one of function of the ALLM function, the VRR function, and the Free Sync function is performed in the electronic device 200, the electronic device 200 may identify that the type of content received from an external device and reproduced in the electronic device 200 is game content. Accordingly, the electronic device 200 may identify the external device as a device corresponding to the game mode (Operation S850). Unlike the above, the electronic device 200 may identify that all of the ALLM function, the VRR function, and the Free Sync function are not performed in the electronic device 200. In this state, the electronic device 200 may identify the external device as a device not corresponding to the game mode (Operation S860).

In FIGS. 9 to 13, according to one or more embodiments, an electronic device 200 displays identification information about an external device corresponding to the operation mode of the electronic device 200, on the display 230 of the electronic device 200, and provides a user with the display 230.

Figure 9:
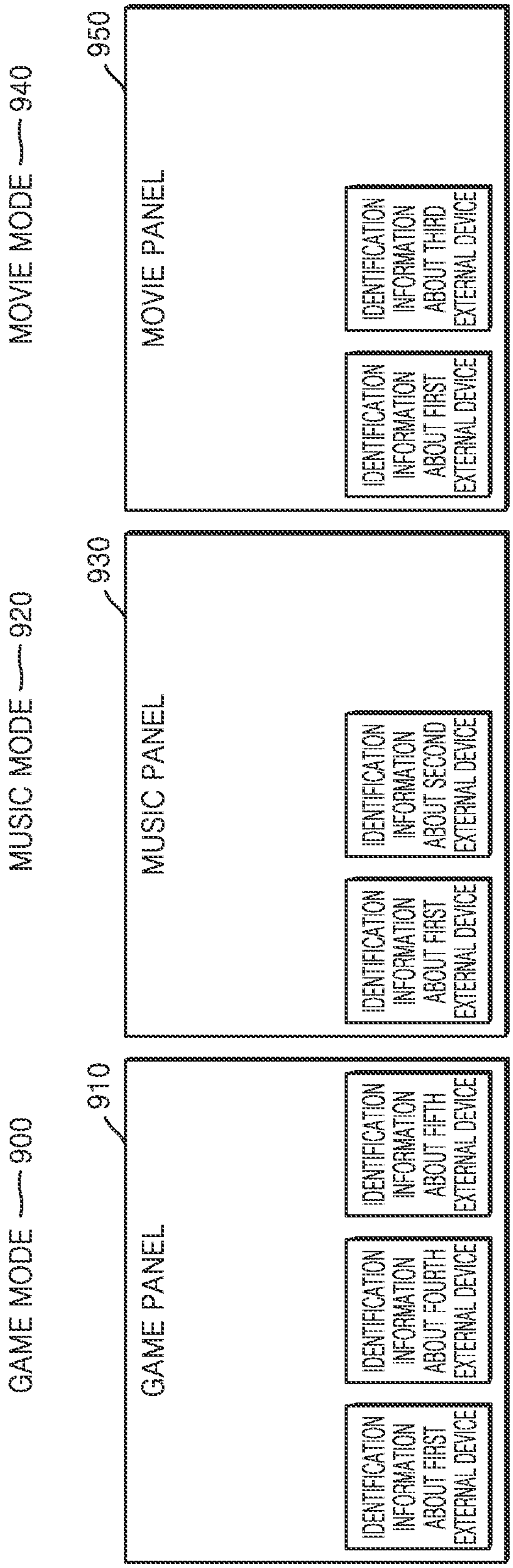
FIG. 9 is a view illustrating displaying identification information about an external device on a panel of an electronic device corresponding to a plurality of preset operation modes of the electronic device, according to an embodiment of the disclosure.

FIG. 9 is a view illustrating an embodiment of displaying identification information about an external device in panels of an electronic device corresponding to a plurality of preset operation modes of the electronic device, according to an embodiment of the disclosure.

Referring to FIG. 9, the electronic device 200, according to an embodiment of the disclosure may display identification information about an external device on the panels of an electronic device corresponding to a plurality of operation modes. For example, the electronic device 200 may have a plurality of panels corresponding to a plurality of operation modes, and a plurality of panels may be activated according to the operation mode of the electronic device 200 and displayed on the display 230. For example, there may be a game panel 910 corresponding to a game mode 900, a music panel 930 corresponding to a music mode 920, and a movie panel 950 corresponding to a movie mode 940. The at least one external device in FIG. 9 may include a first external device, a second external device, a third external device, a fourth external device, and a fifth external device, etc. The electronic device 200 may identify the panel of the display 230 corresponding to the operation mode, and identification information about at least one external device corresponding to the operation mode may be displayed on the panel of the display 230.

For example, the electronic device 200 may identify a first external device, a fourth external device, and a fifth external device, as external devices corresponding to the game mode 900. Accordingly, the electronic device 200 may display the identification information about the first external device, identification information about the fourth external device, and identification information about the fifth external device, on the game panel 910 of the electronic device 200.

Similarly, the electronic device 200 may identify the first external device and the second external device, as at least external device corresponding to the music mode 920. Accordingly, the electronic device 200 may display the identification information about the first external device and identification information about the second external device, on the music panel 930 of the electronic device 200.

The electronic device 200 may identify the first external device and the third external device as at least external device corresponding to the movie mode 940. Accordingly, the electronic device 200 may display the identification information about the first external device and identification information about the third external device, on the movie panel 950 of the electronic device 200.

Figure 10:
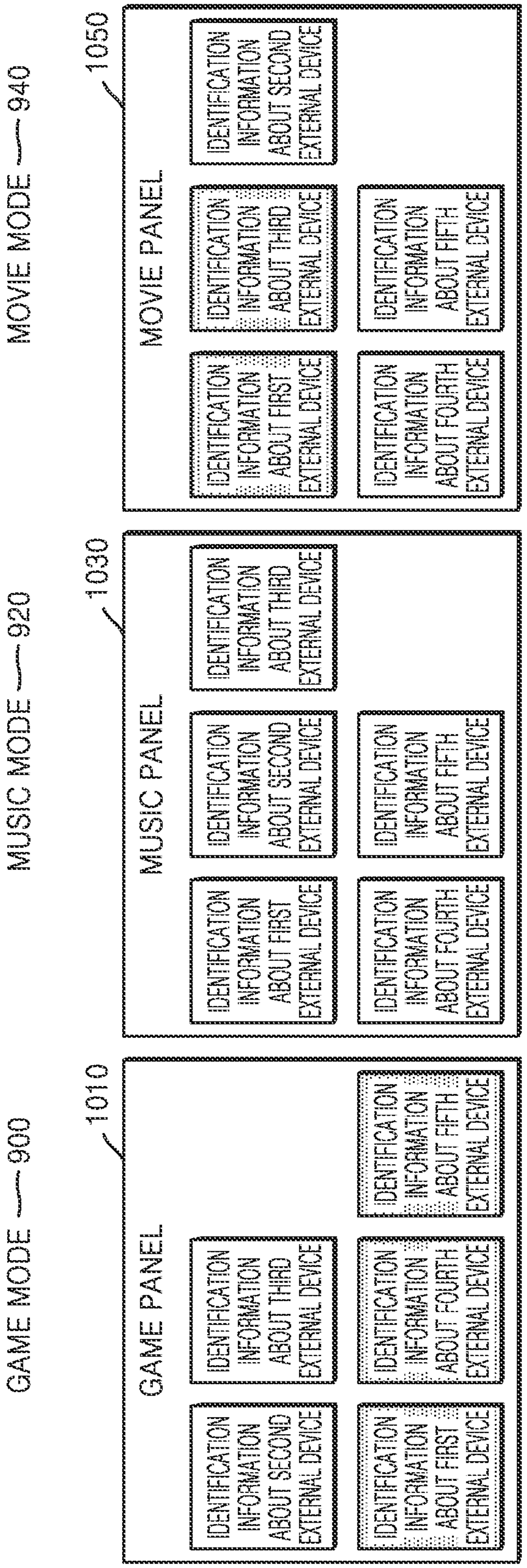
FIG. 10 is a view illustrating displaying identification information about an external device on a panel of an electronic device corresponding to a plurality of preset operation modes of the electronic device, according to an embodiment of the disclosure.

FIG. 10 is a view illustrating an embodiment of displaying identification information about an external device in a panel of an electronic device corresponding to a plurality of preset operation modes of the electronic device, according to an embodiment of the disclosure.

Referring to FIG. 10, the electronic device 200, according to an embodiment of the disclosure, may display identification information about an external device on a common panel of an electronic device. The common panel may be a panel displaying identification information about all external devices connected to the electronic device 200. The at least one external device of FIG. 10 may include a first external device, a second external device, a third external device, a fourth external device, and a fifth external device.

The electronic device 200 may identify the first external device, the fourth external device, and the fifth external device, as at least external device corresponding to the game mode 900. Accordingly, the electronic device 200 may display the identification information about the first external device, the identification information about the fourth external device, and the identification information about the fifth external device, on a common panel 1010 of the electronic device 200 by highlighting the same. In detail, on the common panel 1010 of the electronic device 200, by shading the identification information about the first external device, the identification information about the fourth external device, and the identification information about the fifth external device, the external device corresponding to the game mode 900 that is the operation mode of an electronic device may be emphasized.

Similarly, the electronic device 200 may identify the first external device and the second external device as at least external device corresponding to the music mode 920. Accordingly, the electronic device 200 may display the identification information about the first external device and the identification information about the second external device, on the common panel 1030 of the electronic device 200. In detail, to allow a user to conveniently select an external device according to the music mode 920, the electronic device 200 may display the identification information about the first external device and the identification information about the second external device at the front position in the common panel 1030.

The electronic device 200 may identify the first external device and the third external device as at least external device corresponding to the movie mode 940. Accordingly, the electronic device 200 may display the identification information about the first external device and the identification information about the third external device, on the common panel 1050 of the electronic device 200. In detail, to allow a user to conveniently select an external device according to the movie mode 940, the electronic device 200 may arrange the identification information about the first external device and the identification information about the third external device at the front position in the common panel 1050, and display the identification information about the first external device and the identification information about the third external device by highlighting the same.

Figure 11:
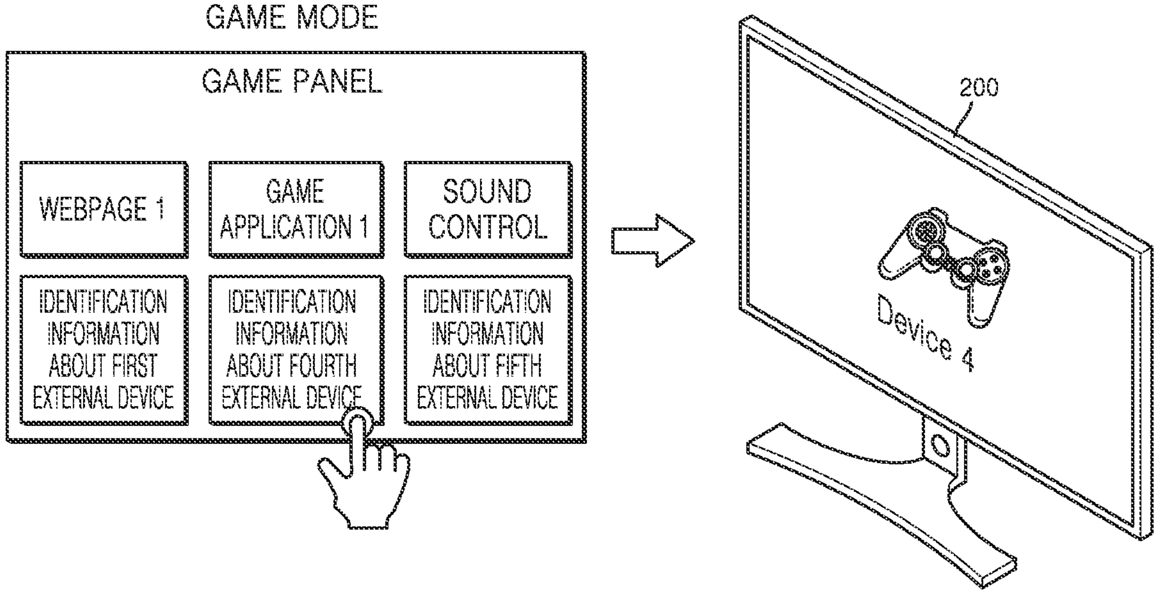
FIG. 11 is a view illustrating an embodiment in which a user selects an external device, based on identification information about at least one external device displayed on a panel of the electronic device, according to an embodiment of the disclosure.

FIG. 11 is a view illustrating an embodiment in which a user selects an external device, based on identification information about at least one external device displayed on a panel display 230 of the electronic device according to an embodiment of the disclosure.

The electronic device 200, according to an embodiment of the disclosure, may identify at least one of an application, a webpage, and a menu function corresponding to the operation mode with identification information about at least one external device corresponding to the current operation mode of the electronic device 200.

The electronic device 200, when operating in a set operation mode, may store, in the memory 210, history information about an operation mode, such as information about executed applications, settings, webpages, contents, and the like. The electronic device 200 may display the previously stored history information about the operation mode of the electronic device 200 on the panel corresponding to the current operation mode of the electronic device 200.

For example, when the operation mode of the electronic device 200 is identified as a game mode, the electronic device 200 may display, on the game panel 1100, the identification information about the first external device, the identification information about the fourth external device, and the identification information about the fifth external device, which are external devices corresponding to the game mode. Furthermore, the electronic device 200 may display, on the game panel 1100, Game Application 1 having a history of being executed over a preset number or more in the game mode, based on the history information about a game mode. Similarly, the electronic device 200 may display, on the game panel 1100, a URL about a sound control function and Webpage 1 among the environment settings, based on the history information about a game mode. As the electronic device 200 displays, on the game panel 1100, the identification information about an external device, the game application information, and the like, the electronic device 200 may provide a user interface through which a user may easily move to the fourth external device through the game panel 1100 displayed on the display 230 of the electronic device 200.

Figure 12:
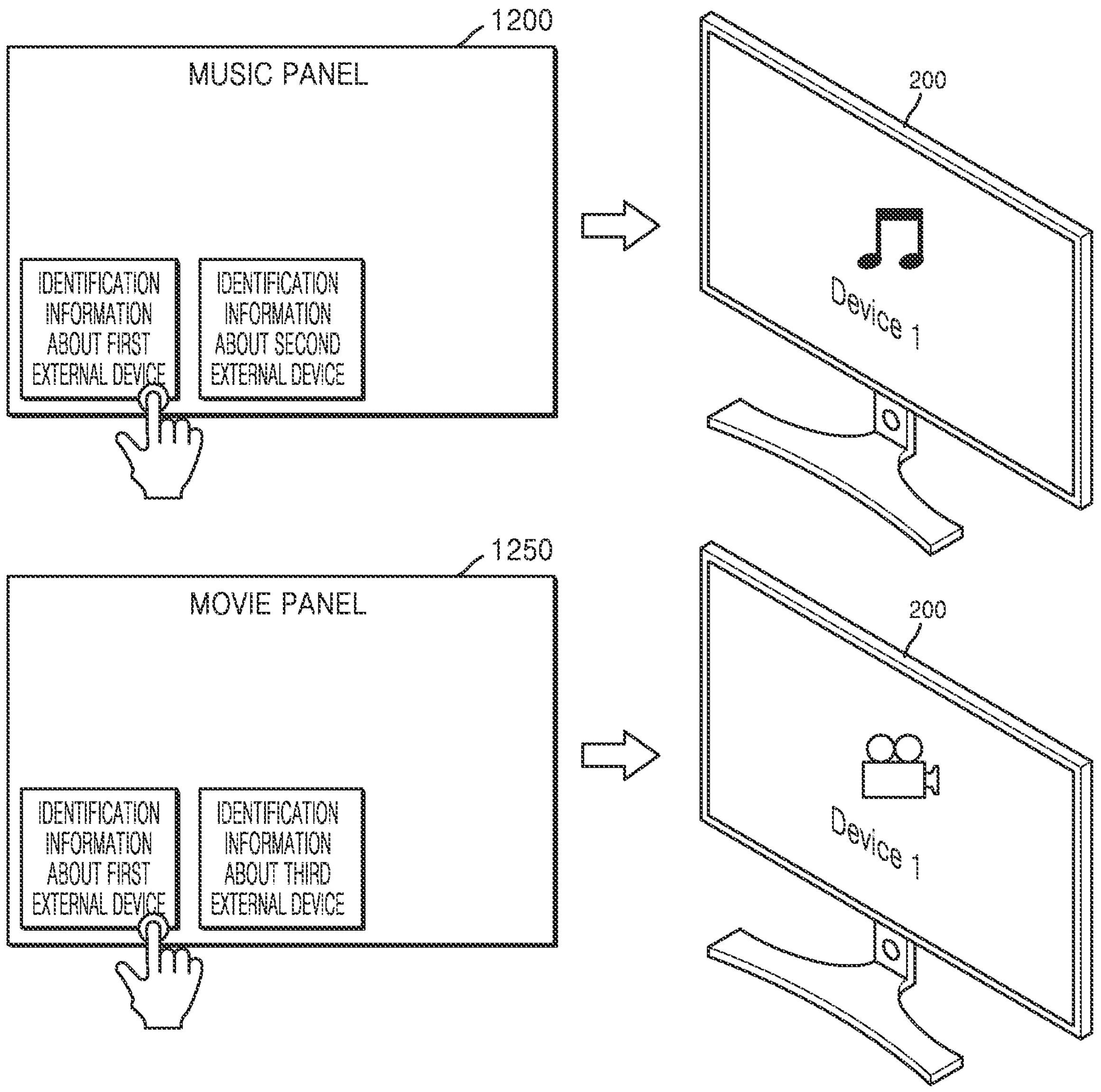
FIG. 12 is a view illustrating an embodiment in which a user selects an external device according to a current operation mode of the electronic device, when the external device is included in a multi-device list, according to an embodiment of the disclosure.

FIG. 12 is a view illustrating an embodiment in which a user selects an external device according to a current operation mode of the electronic device, when the external device is included in a multi-device list, according to an embodiment of the disclosure.

Referring to FIG. 12, an external device connected to the electronic device 200 may be a device used in a plurality of operation modes. In the specification, the device to be used in the operation modes may be referred to as a multi-device. Referring to FIG. 12, a first external device may correspond to a multi-device to be used in both of the music mode and the movie mode.

For example, the first external device may be identified as a device corresponding to the music mode, and the electronic device 200 may display the identification information about the first external device on a music panel 1200. Accordingly, when a user selects the first external device displayed on the music panel 1200 of the display 230, the electronic device 200 may execute music content and the like related to the first external device.

In another example, the first external device may be a device corresponding to the movie mode. Accordingly, when the operation mode of the electronic device 200 is a movie mode, the electronic device 200 may display the identification information about the first external device on a movie panel 1250. Accordingly, when a user selects the first external device displayed on the movie panel 1250 of the display 230, the electronic device 200 may execute movie content and the like related to the first external device.

Figure 13:
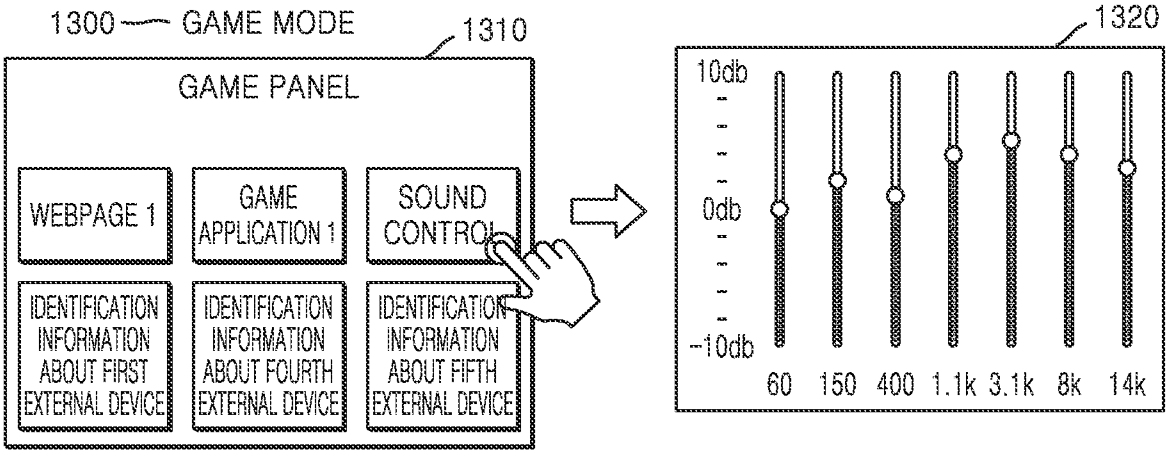
FIG. 13 is a view illustrating an embodiment of displaying at least one of an application, a webpage, or a menu function corresponding to an operation mode of an electronic device, on a display of the electronic device, based on history information about an operation mode of the electronic device, according to an embodiment of the disclosure.

FIG. 13 is a view illustrating an embodiment of displaying at least one of an application, a webpage, or a menu function corresponding to an operation mode of an electronic device, on a display of the electronic device, based on history information about an operation mode of the electronic device, according to an embodiment of the disclosure.

The electronic device 200, according to an embodiment of the disclosure, may display at least one of an application, a webpage, and a menu function corresponding to the operation mode of the electronic device 200, on the panel of the electronic device 200, based on history information about the operation mode of the electronic device 200.

For example, in FIG. 13, the electronic device 200 may identify an application, a webpage, and a menu function to be displayed on the game panel 1310, based on the history information about the game mode 1300 of the electronic device 200.

When the electronic device 200 operates in the game mode 1300, a user may have played Game Application 1 over a threshold value through Game Application 1. The electronic device 200, when operating in the game mode 1300, may store the history information about the operation of the electronic device 200, and the electronic device 200 may identify an application to be display on the game panel 1310 according to the stored history information. The electronic device 200 may display game panel 1310 identification information about Game Application 1, on the game panel 1310 corresponding to the game mode 1300, based on the history information in the game mode 1300, with the identification information about the first external device, the identification information about the fourth external device, and the identification information about the fifth external device.

Similarly, when the electronic device 200 operates in the game mode 1300, a user may have used Webpage 1 and the sound control function more than a preset threshold value. The electronic device 200 may store history information related to Webpage 1 and the sound control function in the memory 210, and identify an environment setting and a webpage to be displayed on the game panel 1310 according to the stored history information. Accordingly, the electronic device 200 may also display identification information about the sound control function and Webpage 1 on the game panel 1310, with the identification information about the first external device, the identification information about the fourth external device, and the identification information about the fifth external device.

Accordingly, to allow a user to conveniently select at least one of an application, a webpage, and a menu function, the electronic device 200 may display at least one of the application, the webpage, and the menu function corresponding to the operation mode of the electronic device 200, on the panel of the electronic device 200. Referring to FIG. 13, a user may select the sound control function in the game panel 1310, and thus, the electronic device 200 may output a user interface (UI) 1320 related to sound control on the display 230.

According to an embodiment of the disclosure, a method disclosed in this document may be provided by being included in a computer program product. A computer program product as goods may be dealt between a seller and a buyer. The computer program product is distributed in the form of a machine-readable storage medium, for example, a compact disc read only memory (CD-ROM), or through application stores or can be distributed directly or online, for example, download or upload, between two user devices, for example, smart phones. In the case of online distribution, at least a part of the computer program product, for example, a downloadable application, may be at least temporarily stored or temporarily generated in a machine-readable storage medium such as a manufacturer's server, an application store's server, or a memory of a relay server.

The above descriptions of the disclosure is for an example, and it will be understood that one of ordinary skill in the art to which the disclosure pertains can easily modify the disclosure into other detailed form without changing the technical concept or essential features of the disclosure. Thus, the above-described embodiments are exemplary in all aspects and should not be for purposes of limitation. For example, each constituent element described to be a single type may be embodied in a distributive manner. Likewise, the constituent elements described to be distributed may be embodied in a combined form.

The scope of the disclosure is defined not by the detailed description of the disclosure but by the appended claims, and all changes and modifications introduced from the concept and scope of the claims and the equivalent concept thereof will be construed as being included in the disclosure.

What is claimed is:

1. A method of operating an electronic device, the method comprising:

identifying, from among a plurality of preset operation modes, a first operation mode of the electronic device that is currently operating on the electronic device, wherein each of the plurality of preset operation modes corresponds to a respective panel and provides a corresponding type of content, and wherein the electronic device is configured to provide a first type of content in the first operation mode;

requesting, to an external device, information about a device type, and receiving, from the external device, the information about the device type, wherein the device type is associated with a type of content provided by the external device;

identifying the device type of the external device based on the received information about the device type;

determining, based on the identified device type of the external device, whether the external device corresponds to the type of content to be provided in the identified first operation mode;

displaying identification information about the external device, based on the determination, on a panel corresponding to the identified first operation mode; and accessing the external device in response to an input selecting identification information about the external device, wherein the panel corresponding to the identified first operation mode includes:

i) the identification information about the external device, and ii) identification information of at least one application installed in the electronic device that provides the first type of content corresponding to the identified first operation mode.

2. The method of claim 1, further comprising obtaining information about the external device comprising at least one of information about a device name of the external device, information about a user input related to the device type of the external device, and information about content reproduced in the electronic device.

3. The method of claim 1, wherein the determining whether the external device corresponds to the type of content to be provided in the identified first operation mode comprises identifying the external device having the device type corresponding to the identified first operation mode, based on the identified device type of the external device.

4. The method of claim 1, wherein the determining whether the external device corresponds to the type of content to be provided in the identified first operation mode further comprises identifying the external device corresponding to a device list previously stored with respect to the identified first operation mode, based on information about a device name of the external device.

5. The method of claim 1, wherein the plurality of preset operation modes include at least one of a movie mode, a game mode, and a music mode.

6. The method of claim 1, wherein the determining whether the external device corresponds to the type of content to be provided in the identified first operation mode further comprises identifying the external device corresponding to the identified first operation mode, based on whether a function related to the identified first operation mode is performed in the electronic device.

7. The method of claim 6, wherein, when the identified first operation mode is a game mode, the identifying the external device corresponding to the identified first operation mode comprises identifying the external device corresponding to the game mode, based on at least one of whether a type of content received from the external device is game content, and whether at least one of an auto low latency mode (ALLM) function, a variable refresh rate (VRR) function, and a Free Sync function are performed in the electronic device.

8. The method of claim 1, wherein the displaying the identification information about the external device further comprises displaying at least one of an application, a webpage, and a menu function corresponding to the identified first operation mode, based on history information about the identified first operation mode.

9. An electronic device comprising:
- a display;
- a memory storing one or more instructions; and
- at least one processor configured to execute the one or more instructions stored in the memory to:
  - identify, from among a plurality of preset operation modes, a first operation mode that is currently operating on the electronic device, wherein each of the plurality of preset operation modes corresponds to a respective panel and provides a corresponding type of content, and wherein the electronic device is configured to provide a first type of content in the first operation mode;
  - request, to an external device, information about a device type, and receive, from the external device, the information about the device type, wherein the device type is associated with a type of content provided by the external device;
  - identify the device type of the external device based on the received information about the device type;
  - determine based on the device type of the external device, whether the external device corresponds to the type of content to be provided in the identified first operation mode;
  - control the display to display identification information about the external device, based on the determination, on a panel corresponding to the identified first operation mode; and
  - access the external device in response to an input selecting identification information about the external device,
- wherein the panel corresponding to the identified first operation mode includes:
  - i) the identification information about the external device, and
  - ii) identification information of at least one application installed in the electronic device that provides the first type of content corresponding to the identified first operation mode.

10. The electronic device of claim 9, wherein the at least one processor is further configured to execute the one or more instructions to obtain information about the external device comprising at least one of information about a device name of the external device, information about a user input related to the device type of the external device, and information about content reproduced in the electronic device.

11. The electronic device of claim 9, wherein the at least one processor is further configured to execute the one or more instructions to identify the external device having the device type corresponding to the identified first operation mode, based on the device type of the external device.

12. The electronic device of claim 9, wherein the at least one processor is further configured to execute the one or more instructions to identify the external device corresponding to a device list previously stored with respect to the identified first operation mode, based on information about a device name of the external device.

13. The electronic device of claim 9, wherein the at least one processor is further configured to execute the one or more instructions to identify the external device corresponding to the identified first operation mode, based on whether a function related to the identified first operation mode is performed in the electronic device.

14. The electronic device of claim 9, wherein the panel comprises a user interface for providing at least one of:
- a list of external devices usable in the first operation mode; or
- a menu or items used in the first operation mode.

15. The electronic device of claim 9, wherein the first operation mode is a game mode to provide game-type content, and a second operation mode is a music mode to provide music-type content.

16. The electronic device of claim 9, wherein the panel corresponding to the identified first operation mode is displayed in a full screen on the electronic device.

17. A non-transitory computer-readable recording medium having recorded thereon a program, which when executed by a computer, performs a method comprising:
- identifying, from among a plurality of preset operation modes, a first operation mode of an electronic device that is currently operating on the electronic device, wherein each of the plurality of preset operation modes corresponds to a respective panel and provides a corresponding type of content, and wherein the electronic device is configured to provide a first type of content in the first operation mode;

requesting, to an external device, information about a device type, and receiving, from the external device, the information about the device type, wherein the device type is associated with a type of content provided by the external device;

identifying the device type of the external device based on the received information about the device type;

determining, based on the identified device type of the external device, whether the external device corresponds to the type of content to be provided in the identified first operation mode;

displaying identification information about the external device, based on the determination, on a panel corresponding to the identified first operation mode; and accessing the external device in response to an input selecting identification information about the external device, wherein the panel corresponding to the identified first operation mode includes:

i) the identification information about the external device, and ii) identification information of at least one application installed in the electronic device that provides the first type of content corresponding to the identified first operation mode.

* * * * *